(12) United States Patent
Lenoski et al.

(10) Patent No.: US 6,747,972 B1
(45) Date of Patent: Jun. 8, 2004

(54) METHOD AND APPARATUS FOR REDUCING THE REQUIRED SIZE OF SEQUENCE NUMBERS USED IN RESEQUENCING PACKETS

(75) Inventors: Daniel E. Lenoski, San Jose, CA (US); William N. Eatherton, Sunnyvale, CA (US); Zubin D. Dittia, Sunnyvale, CA (US); John Andrew Fingerhut, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/519,716

(22) Filed: Mar. 7, 2000

(51) Int. Cl.[7] .............................................. H04L 12/56
(52) U.S. Cl. ..................................................... 370/394
(58) Field of Search ................................ 370/235, 359, 370/360, 389, 394, 418, 419, 471, 474

(56) References Cited

U.S. PATENT DOCUMENTS

| | | | |
|---|---|---|---|
| 4,491,945 A | | 1/1985 | Turner |
| 4,494,230 A | | 1/1985 | Turner |
| 4,630,260 A | | 12/1986 | Toy et al. |
| 4,734,907 A | | 3/1988 | Turner |
| 4,829,227 A | | 5/1989 | Turner |
| 4,849,968 A | | 7/1989 | Turner |
| 4,893,304 A | | 1/1990 | Giacopelli et al. |
| 4,901,309 A | | 2/1990 | Turner |
| 5,127,000 A | | 6/1992 | Henrion |
| 5,173,897 A | | 12/1992 | Schrodi et al. |
| 5,179,551 A | | 1/1993 | Turner |
| 5,179,556 A | | 1/1993 | Turner |
| 5,229,991 A | | 7/1993 | Turner |
| 5,253,251 A | | 10/1993 | Aramaki |
| 5,260,935 A | | 11/1993 | Turner |
| 5,278,828 A | * | 1/1994 | Chao ............................ 370/394 |
| 5,319,360 A | * | 6/1994 | Schrodi et al. .............. 370/390 |
| 5,339,311 A | | 8/1994 | Turner |
| 5,402,415 A | | 3/1995 | Turner |
| 5,617,561 A | * | 4/1997 | Blaauw et al. ............... 370/394 |
| 5,842,040 A | | 11/1998 | Hughes et al. |
| 6,252,876 B1 | * | 6/2001 | Brueckheimer et al. ..... 370/394 |
| 6,314,100 B1 | * | 11/2001 | Roach et al. ................ 370/394 |
| 6,317,430 B1 | * | 11/2001 | Knisely et al. ............. 370/394 |
| 6,351,454 B1 | * | 2/2002 | Crocker et al. ............. 370/235 |

OTHER PUBLICATIONS

Jonathan S. Turner, "An Optimal Nonblocking Multicast Virtual Circuit Switch," Jun. 1994, Proceedings of Infocom, 8 pages.

Chaney et al., "Design of a Gigabit ATM Switch," Feb. 5, 1996, WUCS–96–07, Washington University, St. Louis, MO, 20 pages.

Turner et al., "System Architecture Document for Gigabit Switching Technology," Aug. 27, 1998, Ver. 3.5, ARL–94–11, Washington University, St. Louis, MO, 110 pages.

* cited by examiner

*Primary Examiner*—Chi Pham
*Assistant Examiner*—Anh-Vu Ly
(74) *Attorney, Agent, or Firm*—The Law Office of Kirk D. Williams

(57) ABSTRACT

In one implementation, a first set of packet switch sequence numbers is used for end-to-end resequencing of packets within a packet switch, and a second set of interconnection network sequence number is used in the resequencing of packets within an interconnection network of the packet switch. A packet switch sequence number is maintained at each input interface of the packet switch for each output interface, while each output interface maintains a packet switch sequence number for each input interface. A corresponding sequence number is added to packets sent between corresponding input-output interface pairs. Similarly, an interconnection network sequence number is maintained at each input port of an interconnection network for each output port, while each output port maintains an interconnection network sequence number for each input port. A corresponding sequence number is added to packets sent between corresponding input-output port pairs.

62 Claims, 16 Drawing Sheets

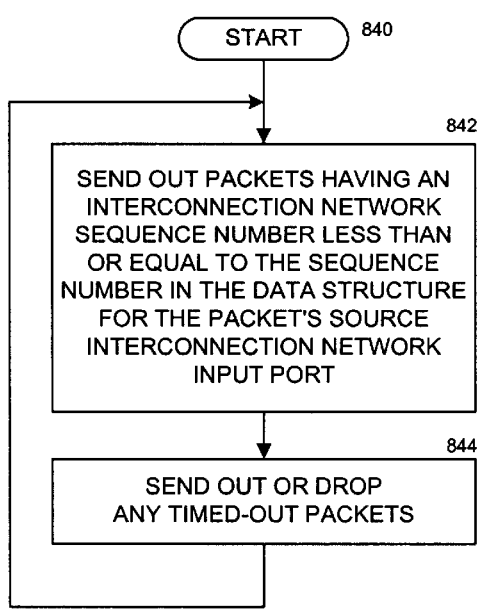
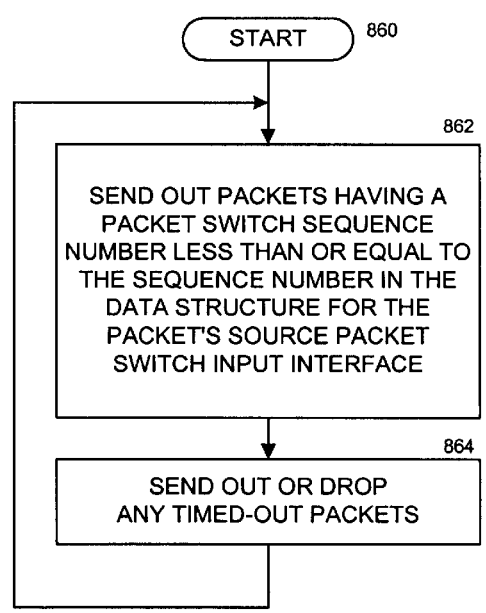
FIG. 8C
FIG. 8D

METHOD AND APPARATUS FOR REDUCING THE REQUIRED SIZE OF SEQUENCE NUMBERS USED IN RESEQUENCING PACKETS

FIELD OF THE INVENTION

This invention relates to communications systems and networks; and more particularly, the invention relates to reducing the required size of sequence numbers used in resequencing packets. This invention is especially useful in the design and operation of packet switches, but is not limited to this environment.

BACKGROUND OF THE INVENTION

The communications industry is rapidly changing to adjust to emerging technologies and ever increasing customer demand. This customer demand for new applications and increased performance of existing applications is driving communications network and system providers to employ systems having greater speed and capacity (e.g., greater bandwidth). In trying to achieve these goals, a common approach taken by many communications providers is to use packet switching technology. Packet technology typically allows many information types to be transmitted over the same transmission lines and using the same packet switching systems and devices.

As used herein, the term "packet" refers to packets of all types, including fixed length cells and variable length packets. Moreover, these packets may contain one or more types of information, including, but not limited to, voice, data, video, and audio information. Furthermore, the term "system" is used generically herein to describe any number of components, packet switch elements, packet switches, networks, computer and/or communication devices or mechanisms, or combinations thereof.

Consumers and designers of these systems typically desire high reliability and increased performance at a reasonable price. A commonly used technique for helping to achieve this goal is for these systems to provide multiple paths between a source and a destination. Packets of information are then dynamically routed and distributed among these multiple paths. It is typically more cost-effective to provide multiple slower rate links or switching paths, than to provide a single higher rate path. Such designs also achieve other desired performance characteristics.

An artifact of using dynamic routing is the need to resequence each of the streams of packets dynamically routed through a packet switch back into their original order. One known technique for dynamically routing and resequencing streams of packets is to add a sequence number to each packet and then to place packets in sequential order based on these added sequence numbers. Separate sequence numbers are required for each switch input-output pairing. For example, each input interface of the packet switch must keep a separate sequence number counter for each output of the packet switch; and each output interface of the packet switch must keep a separate counter for each input of the packet switch. This technique is simple, but it requires a substantial amount of resources for lengthy buffers and sequence number counters. The resources required for these buffers and counters must be sufficient to distinguish the order of the packets even when worst cast delay differentials between paths occur. The size of these counters and the number and size of the buffers required for this resequencing technique are large, and it is difficult to place a bound on the resources required to implement such a system. Desired are improved methods and systems for dynamically routing and resequencing packets in a packet switch, especially those methods and systems which place a bound on the size requirements of sequence numbers.

Controlling the distribution of packets across the multiple paths between input and output pairs can be used to optimize the resequencing function and to improve performance. Two commonly used techniques of distributing traffic among the multiple paths between a source and destination are a pure round robin distribution and a pure random distribution. Both of these techniques fail to consider the destination or a downstream point in the network when distributing the traffic. The pure round robin technique repetitively sequences through each of the multiple paths in the same order for traffic without regard to a packet's destination. The pure random distribution technique randomly selects one of the multiple paths without regard to a packet's destination. However, such techniques are deficient in their resultant throughput. Desired are improved methods and systems for achieving greater throughput.

SUMMARY OF THE INVENTION

A packet switch has multiple in-order delivery interconnection elements. Coupled to the multiple in-order delivery interconnection elements are multiple packet switch input interfaces and multiple packet switch output interfaces. Each packet switch interface may include a packet distributor to distribute packets in accordance with a distribution scheme across the multiple in-order delivery interconnection elements and a packet switch sequencer to add a sequence number within a sequence number range to packets to be sent across the plurality of in-order delivery interconnection elements, the range of the sequence numbers being dependent on the packet distribution scheme. Each packet switch output interface may included a packet switch resequencer.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIGS. 8A–D are flow diagrams illustrating methods for packet switching.

DETAILED DESCRIPTION

Figure 1A:
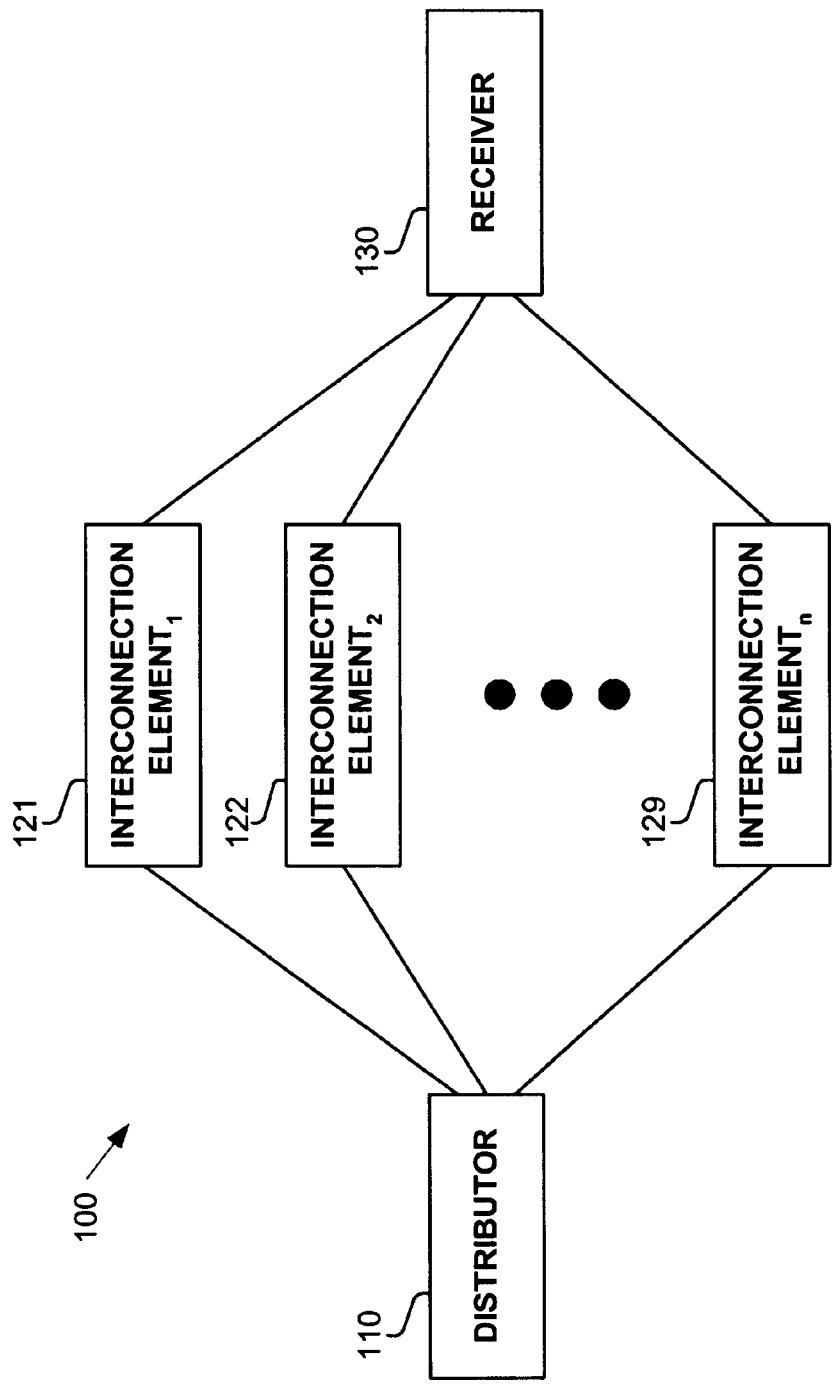
FIGS. 1A–C are block diagrams of a few of many possible operating environments.

Methods and apparatus are disclosed for, inter alia, distributing packets among multiple interconnection elements, determining over which one of multiple paths between identified starting and ending points to route a data item, using a hierarchy of distributors at the packet switch and interconnection element levels to distribute packets among possible routes; using sequence numbers having a bounded size for resequencing packets at a destination, and using hierarchical sets of sequence numbers to resequence packets within a packet switch. An unlimited number of embodiments are possible, with various embodiments employing one or more distribution schemes and/or one or more sets of sequence numbers. Moreover, embodiments as described herein include various elements and limitations, with no one element or limitation contemplated as being a critical element or limitation. Each of the claims individually recite an aspect of the invention in its entirety. Moreover, such embodiments may include, inter alia, systems, integrated circuit chips, methods, and computer-readable medium containing instructions. The embodiments described hereinafter embody various aspects and configurations within the scope and spirit of the invention.

Packet Distribution

Methods and apparatus are disclosed herein for determining which one of multiple paths between identified starting and ending points to route a data item, and for distributing traffic among multiple paths between a starting and an ending point in a network or system. Such methods and apparatus may be practiced as part of a network, computer system, or any other system in which information is transmitted between two points over multiple paths. Moreover, the route may be determined at the point of traffic distribution, or at another location which provides the determined route to the point of traffic distribution, such as including the determined route as part of a data packet (including adding a routing header to the information packet) or possibly using out of band signaling to a distribution point. In addition to increasing performance through a network, controlling the distribution of packets across the multiple paths between input and output pairs can be used to optimize the resequencing function. Note, the distribution schemes disclosed herein may be used with any resequencing mechanism (including, but not limited to using sequence numbers and/or time-stamps), and vice versa. Many different embodiments are possible in keeping with the scope and spirit of the invention The efficient distribution of traffic also simplifies resequencing of the packets at the destination or some other downstream location back into their original order. Controlling the distribution of packets across the multiple paths between input and output pairs can be used to optimize the resequencing function and to improve performance. For example, the receiver resequences packets from a particular source or stream back into their original order using one of numerous techniques known in the art. Moreover, some embodiments described herein further engineer the traffic between selected starting and ending points for each type and/or priority of traffic.

Various embodiments and mechanisms for distributing traffic as described herein provide increased throughput over prior approaches (e.g., pure round robin, random distribution technique, etc.) that make routing decisions without regard to a destination or downstream point in the network. Typically, a packet may take one of multiple paths through a switching system to reach a particular destination. Such a switching system may comprise multiple interconnection networks, with each of these interconnection networks providing a set of one or more distinct paths between each of the inputs and outputs of the switching system. The prior techniques typically, at each of the input ports, distribute incoming data packets by sequencing through or randomly selecting the path over which to route the information packet without regard to the destination of the particular packet or traffic pattern between the input port and destination.

In contrast, in one embodiment, the traffic distribution at each distribution point is engineered for the traffic being sent to a particular destination (or through some downstream point in the network). In this manner, the traffic pattern across the paths between selected starting and ending points can be engineered to achieve increased performance. Embodiments distribute traffic among one or more paths and/or interconnection elements, including, but not limited to links, interconnection networks, planes of a packet switch, individual routes through an interconnection network, individual routes through a device (e.g., a packet switch) coupling the starting and ending points, etc.

For example, in one embodiment, a distributor maintains a data structure at each of the distribution points for each of the destinations. The embodiment updates these data structures to indicate the traffic distribution between the distribution point and each of the destinations, which allows the embodiment to select an optimal path over which to route a next packet of information. Other embodiments update the data structure using network congestion information instead of, or in addition to the traffic distribution information.

In the same manner, in one embodiment, a distributor maintains a data structure at each of the distribution points for each of the destinations for each of the types and/or priorities of traffic. This data structure is updated to indicate the traffic distribution between the distribution point and each of the destinations for each of the types and/or priorities of traffic, which allows selection of an appropriate path over which to route a next packet of information. In certain embodiments, the overall traffic over a particular path (e.g., interconnection network, or one of the multiple paths through the interconnection network) is considered in performing the traffic engineering. Once again, network congestion information may be used instead of, or in addition to the traffic distribution information.

In some embodiments, various optimization techniques are employed. For example, in one embodiment, a distributor determines the traffic distribution based on a certain maximum number of packets to be sent over a particular path. In other words, for each distribution cycle, a packet is sent from a particular starting point to a particular destination point over each of the possible paths a predetermined number of times. In the case of the predetermined number of times being one, then a bitmap at each of the distribution points can be maintained to indicate which of the paths have been used, or those paths still available, within the current distribution cycle. Various techniques can be employed to select which particular path to use within a distribution cycle, including use of deterministic (e.g., a round robin between paths leading to the particular destination) and/or non-deterministic methods (e.g., a random selection of one of the paths leading to the particular destination). In certain embodiments, selection between the available paths remaining within a distribution cycle is based on current traffic over a particular path (or on the path's respective interconnection network). For example, if the switching system employs buffers or queues, then selection between those available paths may be made based on which has the smallest queue length.

Certain embodiments employ additional optimization techniques to decrease the size of the data structure used to maintain one or more of the traffic patterns and/or simplify the processing to determine which of multiple paths to select for routing a particular packet. For example, by partitioning the space of possible paths which may be selected into groups or subsets, the amount of space and processing required can be decreased.

To help demonstrate this aspect of such embodiments, assume that a certain switching system has 2048 input ports and 2048 output ports (with each output port corresponding to an identifiable destination for a packet) and thirty-two interconnection networks (or interconnection elements) interconnecting the input and output ports. Then, each of the 2048 input ports would maintain a data structure tracking the packets sent to each of the 2048 output ports for each of the 32 interconnection networks. In the case where only a single packet sent to a particular output port is allowed to be routed only once in a distribution cycle over each interconnection network, a bitmap of 32 bits could be used to track each port having been selected to be sent, or remaining to be sent a packet in a given distribution cycle. This would require each input ports to maintain 32 bits times 2048 output ports equaling 64 Kbits of traffic data structure for each of the 2048 input ports.

One technique to decrease the size of this bitmap is to partition the 32 interconnection networks into groups within a distribution cycle. A cycle selector (e.g., a counter for each destination) could be used to select a current group within a distribution cycle. Thus, the size of a bitmap at each input port when using four groups within a distribution cycle is one-fourth of the size of a bitmap used for a distribution cycle without groups (e.g., 16 Kbits–64 Kbits divide by four groups). The amount of savings becomes even more dramatic as the number of interconnection networks or paths increase, and if distribution cycles are used for each type and/or priority of traffic. Such is the case for the size of the traffic data structure required when traffic is distributed based on each of the multiple paths within an interconnection network (rather than only based on which of the interconnection networks is used). Many other possible embodiments employing various optimization techniques and combinations thereof are possible in keeping within the scope and spirit of the invention.

Bounding the Number and Size of Sequence Numbers

Methods and packet switches are disclosed herein for using sequence numbers for resequencing a sequence of packets distributed among multiple paths. When a packet switch, or some other device, uses sequence numbers and evenly distributes packets across its in-order delivery interconnection elements, the range of sequence numbers required and the size of an individual sequence number are reduced. As used herein, an "in-order delivery interconnection element" is an interconnection element (e.g., links, interconnection networks, a packet switch, etc.) that delivers packets from a particular output of the interconnection element in the same order they were received at a particular input of the interconnection element and destined for the particular output.

In one embodiment, packets are sent from a distributor over n interconnection elements to a receiver in distribution cycles. In each distribution cycle, m number of packets are allowed to be sent over each interconnection element, where m is some predetermined number determined when the device is configured or during operation of the device. The values of n and m can either be static, or vary during the operation of the device. A distribution cycle is complete when the m packets have been sent across all the interconnection elements. In one embodiment, the interconnection elements which are not currently active for sending packets across (e.g., hot spares, non-functioning interconnection elements, etc.) are ignored for this purpose.

Combining the use of sequence numbers and some even distribution technique, such as one of the distribution techniques disclosed herein or some other distribution scheme, limits the sequence number range required to identify a sequence number to be a minimum of at least mn different sequence numbers. Thus, in a binary representation, a sequence number can be identified in $\log_2 nm$ bits. In this manner, a bound can be determined for the resources required to maintain sequence numbers (e.g., the size of sequence number counters).

Limiting the range of the sequence number space may be important for a number of additional reasons. In one embodiment, the amount of buffer space required to hold packets waiting to be resequenced may be limited by mn. In one embodiment, having this hard limit removes the need to put a time-bound on the amount of misordering that can occur in the interconnection network. In one embodiment, there is no need for acknowledgment messages to be sent from receiver to sender that are commonly used to limit the size of the sequence number space is some implementations.

Hierarchical Use of Distributors and Sequence Numbers

The use of distributors and/or sequenced numbers in a singular or hierarchical configurations is described herein. An example of such a hierarchical configuration of distributors is a packet switch which distributes traffic at its input interfaces among the interconnection networks, as well as distributing traffic among the paths within each of the interconnection networks. Similarly, an example of such a hierarchical use of sequence numbers is a packet switch which uses one set of sequence numbers at the packet switch level to resequence packets, and uses another set of sequence numbers within each interconnection network to resequence packets. In certain embodiments, both hierarchical distributors and hierarchical sequence numbers are used, including one embodiment using hierarchical distributors and sequences as described in the previous examples. Other embodiments having a hierarchical configuration use only either hierarchical distributors or hierarchical sets of sequence numbers.

Hierarchical Distributors

In one embodiment, a hierarchy of distributors is used to distribute packets among multiple paths between a starting and an ending point, and to distribute packets among multiple sub-paths within each path. In one embodiment, a device includes an input interface and an output interface coupled together by multiple device-level interconnection elements forming multiple paths between the input and output interfaces. Each device-level interconnection element has an input port and an output port coupled together by multiple interconnection elements, forming multiple paths within each interconnection element. A distributor may be located in or coupled to each input interface of the device to distribute traffic among the multiple device-level interconnection elements. Additionally, a distributor may be located in or coupled to each input port of a device-level interconnection element to distribute traffic among the multiple paths through the device-level interconnection element. For clarity, only two levels of hierarchy are described, while other embodiments may use more than two hierarchical levels of distributors. Additionally, one embodiment uses only a device-level distributor to distribute packets among the device routes between the input and output interfaces, where a device route is identified by a device-level interconnection element and a path through the device-level interconnection network.

Hierarchical Sequence Numbers

In one embodiment, hierarchical sets of sequence numbers are used to resequence packets within a packet switch. In one embodiment, a first set of packet switch sequence numbers is used for end-to-end resequencing of packets within a packet switch. Additionally, a second set of interconnection network sequence numbers is used in the resequencing of packets within an interconnection network of the packet switch. Other embodiments use additional sets of hierarchical sequence numbers in keeping within the scope and spirit of the invention.

In one embodiment, data is received at the input interfaces of a packet switch and converted into packets (or arrives as packets). The input interfaces typically include one or more packet switch sequencers that maintain a data structure containing a current packet switch sequence number for each output interface. These sequence numbers will be used in resequencing packets at the destination output interface. The packet switch sequencer adds to the packets (e.g., includes in a field of the packet) the appropriate packet switch sequence number for the destination output interface of the packet switch, with the packet switch sequencer updating its data structure to maintain current packet switch sequence numbers. The packet is then dynamically routed to one of the interconnection networks.

An interconnection network receives the packet at one of its input ports connected to the sending input interface. Each interconnection network typically includes one or more interconnection network sequencers which maintain a data structure containing a current interconnection network sequence number for each output port. These sequence numbers will be used in routing a next packet to the destination output interface. The interconnection network sequencer adds to each packet (e.g., includes in a field of the packet) the appropriate interconnection network sequence number for the destination output port of the packet switch, with the interconnection network sequencer updating its data structure to maintain current packet switch sequence numbers. Each packet is then routed through the interconnection network to an output port of the interconnection network having an interconnection network resequencer. The interconnection network resequencer, using one of many techniques known in the art, resequences the packets received based on the interconnection network sequencer number included in each of the packets. In addition, the interconnection network resequencer maintains a data structure containing an expected interconnection network sequence number for each of the input ports of the interconnection network. In this manner, the interconnection network resequencer knows if a received packet can be immediately forwarded to an output interface of the packet switch, or whether it should be delayed or buffered until a packet earlier in the packet sequence arrives. This data structure may take many forms such as an array or table of values, or a set of counters.

Packets are received at the output interfaces of the packet switch from the interconnection networks. As packets are dynamically routed through the packet switch, another level of resequencing is required (in addition to the resequencing of packets performed by the interconnection networks). One or more packet switch resequencers are typically included in the output interfaces of the packet switch, although they could be located elsewhere. The interconnection network resequencers, using one of many techniques known in the art, resequence the packets received based on the packet switch sequencer number included in each of the packets. In addition, the interconnection network resequencer maintains a data structure containing an expected packet switch sequence number for each of the input interfaces of the packet switch. In this manner, the packet switch resequencer knows if a received packet can be immediately forwarded to a system external to the packet switch, or whether it should be delayed or buffered until a packet earlier in the packet sequence arrives. This data structure may take many forms such as an array or table of values, or a set of counters.

For clarity of description, embodiments are described herein having two hierarchical sets of sequence numbers: packet switch sequence numbers and interconnection network sequence numbers. However, the invention has no such limitation as the invention does not limit the number of hierarchical sets which can be used in a packet switch or packet switching system.

Using a hierarchical sequence numbering scheme allows certain embodiments to partition the overall sequence number space into multiple sets of sequence numbers that results in increased performance while distributing the complexity and buffering requirements of the system. Moreover, the performance is increased in embodiments that allow dynamic routing both at all levels of the hierarchy, especially when compared to implementations that restrict dynamic routing to a single level and force in-order delivery at lower levels. Especially in systems where it is desirable to have flexible routing at each level, the use of a hierarchical sequence numbering scheme simplifies the complexity of a system by reducing the buffering requirements at the higher levels of the hierarchy (in conjunction with distribution function), and distributing the buffering function by re-ordering first within the lower-levels of the hierarchy and then at higher (outer) levels. In certain embodiments, the additional cost of resequencing at the lower-levels of hierarchy (instead of only once at the outer sections of the system) is outweighed by the performance and bounded size of the required sequence numbers, as the burden of resequencing at the lower-levels is not large in that each of the sub-networks only has N/M ports where N is the total number of ports in the next (usually top) level of system and M is the number of subnetworks into which the system is divided.

Details of Exemplary Embodiments

Turning now to the figures, FIGS. 1A–C and 2 and their discussion herein are intended to provide a description of a general environment in which the distribution techniques described herein may be practiced for distributing packets across multiple paths leading to a destination. The distribution technique is not limited to a single networking or computing environment. Rather, the architecture and functionality supporting such a distribution as taught herein and would be understood by one skilled in the art is extensible to an unlimited number of networking, communication, and computing environments and embodiments in keeping with the scope and spirit of the invention.

FIG. 1A illustrates an exemplary networked operating environment 100. A distributor 110 routes data, typically in the form of a packet of information, to receiver 130 over interconnection elements 121–129. The number of interconnection elements 121–129 may vary depending on the application and implementation of the system. Distributor 110 employs various techniques to efficiently route information over interconnection elements 121–129 to receiver 130 in accordance with the present invention. Distributor 110 determines the particular route itself for each packet, or the particular route could be selected by another device in which the selected route is relayed to distributor 110 via some mechanism, such as including the selected route in the packet's header or via routing signaling messages.

Figure 1B:
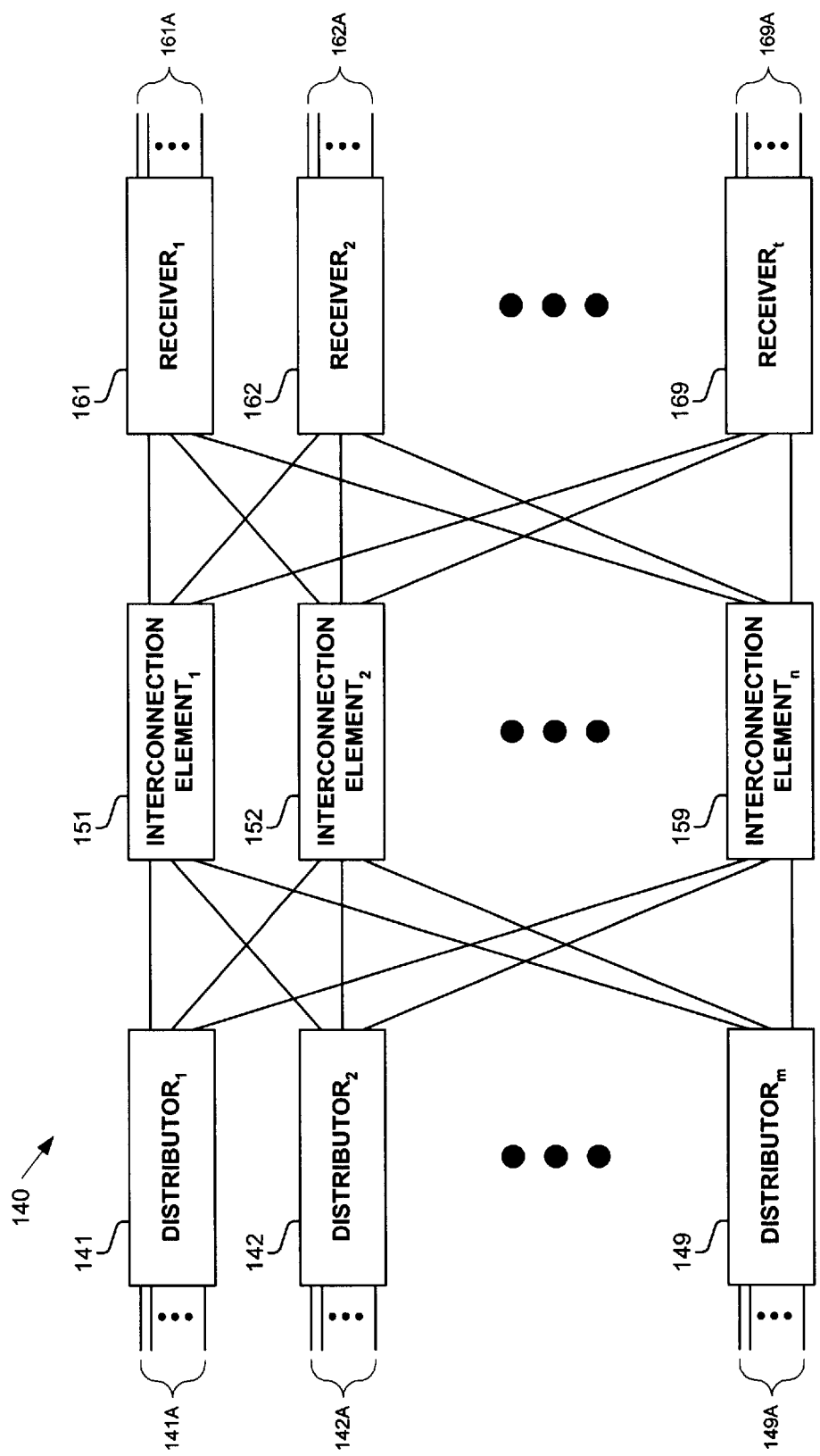

FIG. 1B illustrates another exemplary networked operating environment 140. Multiple distributors 141–149 individually route data, typically in the form of packets of information, to receivers 161–169 over interconnection elements 151–159. Illustrated in FIG. 1B are m distributors 141–149, n interconnection elements 151–159, and t receivers 161–169. The number of distributors 141–149, interconnection elements 151–159, and receivers 161–169 may vary depending on the application and implementation of the system. In the illustrated embodiment, distributors 141–149 have inputs 141A–149A, respectively, and receivers 161–169 have outputs 161A–169A, respectively. Various embodiments employ different destinations used in determining which path to route a packet of information. For example, the destination may be a particular one of receivers 161–169, or a particular one of outputs 161A–169A of receivers 161–169. In a similar manner, various embodiments employ different starting points used in determining which path to route a packet of information. For example, a starting point could be a particular one of distributors 141–149, or a particular one of inputs 141A–149A of distributors 141–149.

Figure 2:
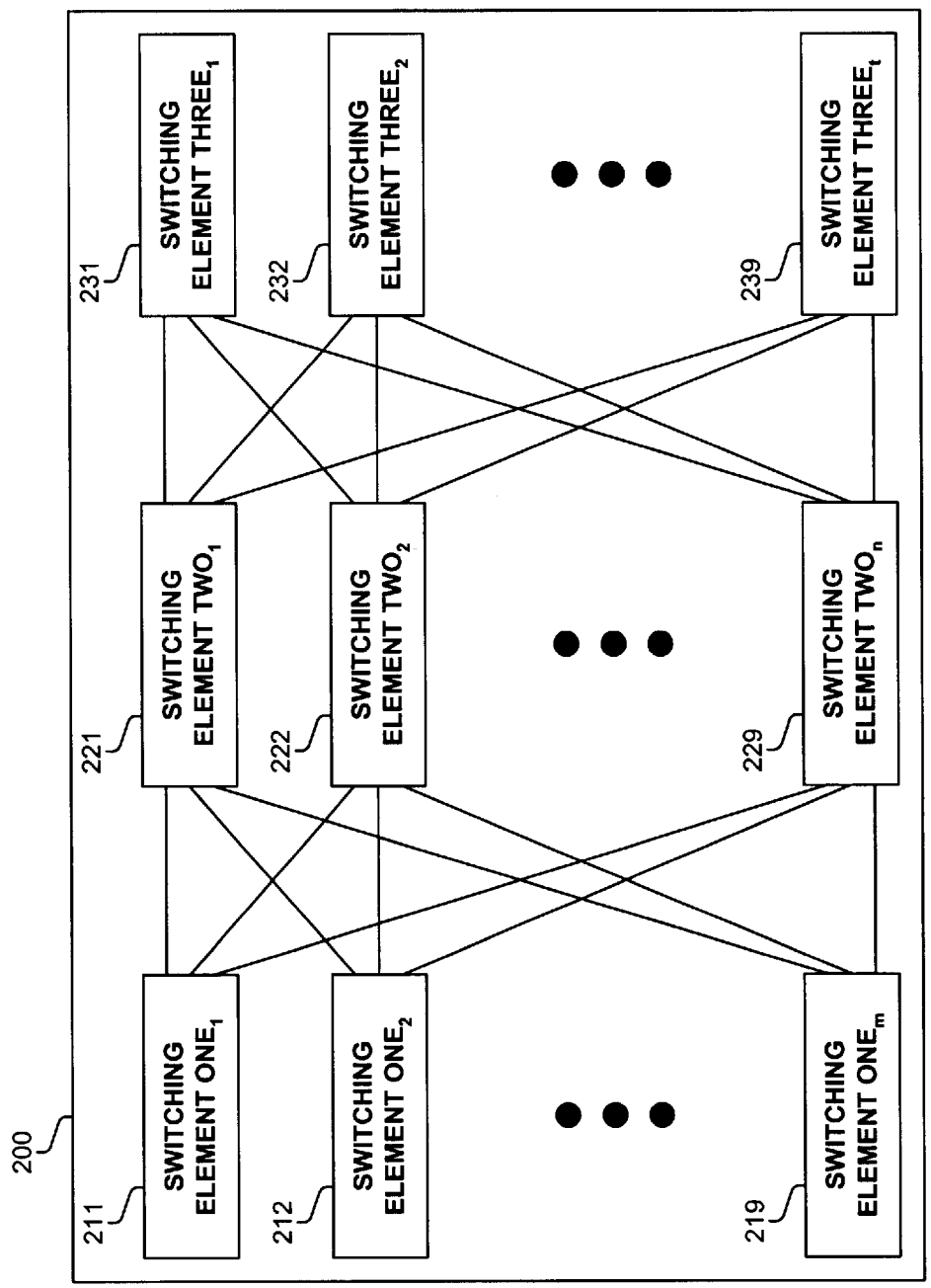
FIG. 2 is a block diagram illustrating an interconnection network.

FIG. 2 illustrates one of many possible embodiments of an interconnection element 200, which could be used for some or all of the interconnection elements 121–129 (FIG. 1A) and for some or all of the interconnection elements 151–159 (FIG. 1B). Referring to FIG. 2, an interconnection element 200, may comprise, for example, a switching fabric, switching plane, or other network, having a number of switching elements 211–239. Illustrated is a three-stage packet interconnection element 200, with a first stage of switching elements one 211–219, interconnected with a second stage of switching elements two 221–229, which are interconnected with a third stage of switching elements three 231–239.

Returning to FIGS. 1A–B, it should be noted that interconnection elements 121–129 (FIG. 1A) and interconnection elements 151–159 (FIG. 1B) could also be a single connection or wire (instead of an interconnection network), or numerous other communications mechanisms, including a single or multiple networks being of the same or of a different type. In the case of a single connection, an embodiment of the system shown in FIG. 1A is a distributor 110 interconnected by multiple wires 121–129 to receiver 130.

Figure 1C:
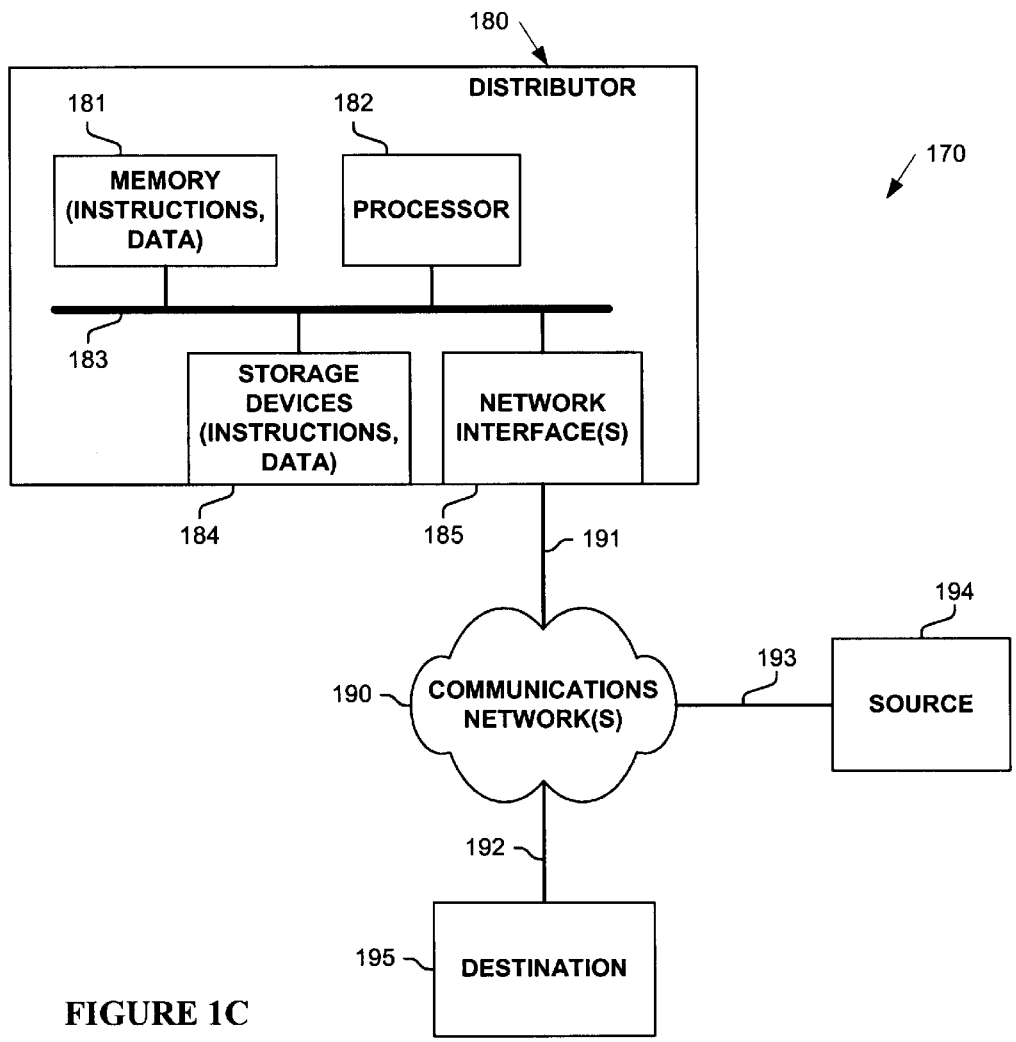

FIG. 1C illustrates another operating environment 170. Referring to FIG. 1C, a distributor 180 is interconnected by one or more links 191 to communications network(s) 190 and to one or more destinations 195 over one or more links 192. Data may be originated within distributor 180, or from one or more external sources 194 interconnected thereto, using links 193 Distributor 180 could take many forms including a personal computer or workstation. Additionally, distributor 180 could even be a traditional router, in which case distributor 180, although not required, would typically have multiple network interfaces 185, with separate communications networks 190 and links 191 connecting to the source 194 and destination 195.

The embodiment of the distributor 180 illustrated in FIG. 1C, or a variant thereof, can also be used as distributor 110 of FIG. 1A, or distributor 141–149 of FIG. 1B. Distributor 180 typically comprises a standard computer platform, a specialized computer or communications platform, including, but not limited to a desktop computer, a laptop computer, personal data assistant, a handheld computer, or a router. For purposes of simplicity, only one distributor 180 is shown; however, the number of distributors 180 supported by the distribution technique disclosed herein is unbounded.

In an embodiment, distributor 180 comprises a processor 182, memory 181, storage devices 184, and one or more network interface(s) 185, which are electrically coupled via bus 183. Network interface(s) 185 are connected to one or more communications network(s) 190 (e.g., one or more networks, including, but not limited to the Internet, private or public telephone, cellular, wireless, satellite, cable, local area, metropolitan area and/or wide area networks) over one or more links 191. Memory 181 is one type of computer-readable medium, and typically comprises random access memory (RAM), read only memory (ROM), integrated circuits, and/or other memory components. Memory 181 typically stores computer-executable instructions to be executed by processor 182 and/or data which is manipulated by processor 182 for implementing functionality described herein. Storage devices 184 are another type of computer-readable medium, and typically comprise disk drives, diskettes, networked services, tape drives, and other storage devices. Storage devices 184 typically store computer-executable instructions to be executed by processor 182 and/or data which is manipulated by processor 182 for implementing functionality described herein.

As used herein, computer-readable medium is not limited to memory and storage devices; rather, computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit information.

Figure 3A:
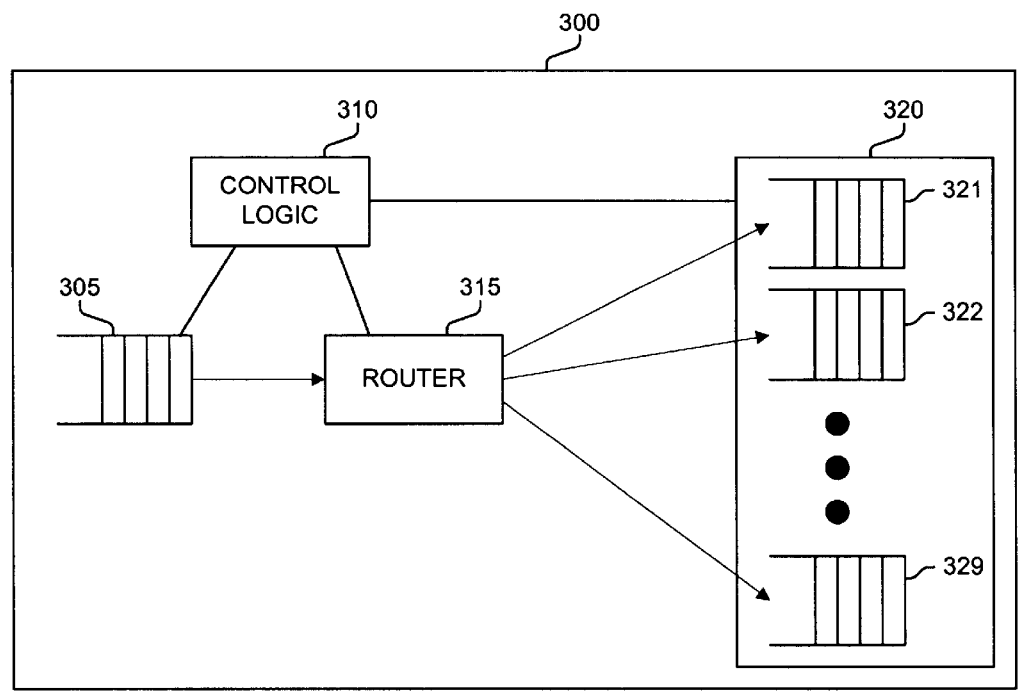
FIGS. 3A–B are block diagrams of a control and routing logic arrangement.
Figure 3B:
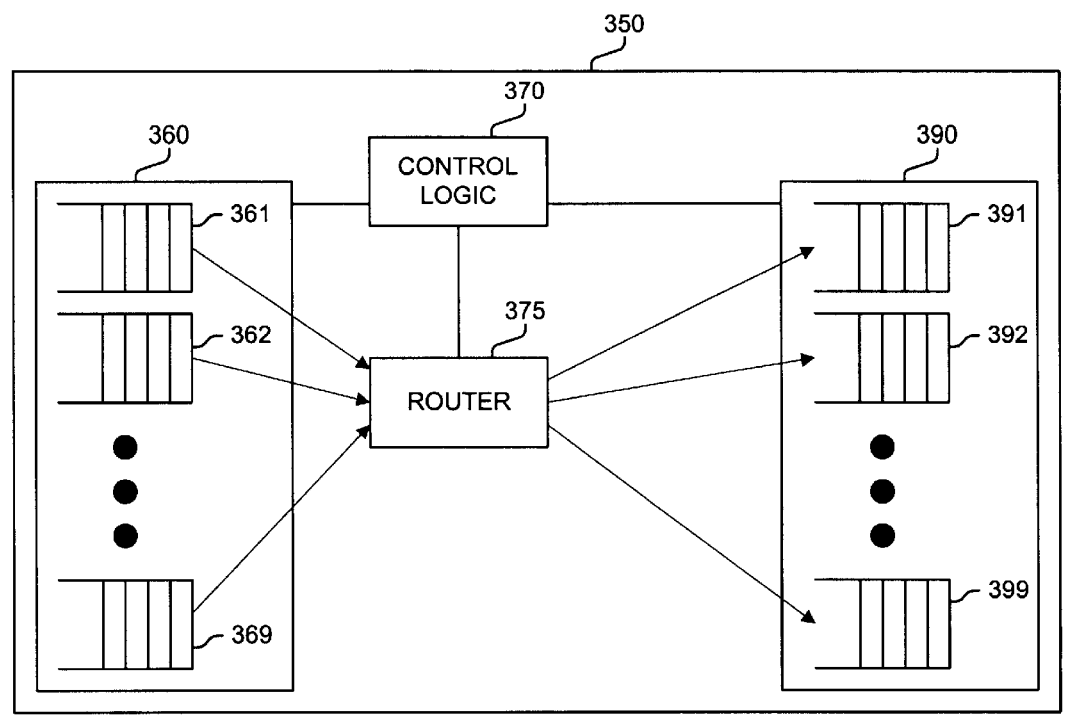

FIGS. 3A–B illustrate two of many possible embodiments for a distributor. First, turning to FIG. 3A, illustrated is an embodiment 300, which could be used as distributor 110 (FIG. 1A) or a distributor 141–149 (FIG. 1B). Distributor 300 obtains data to be routed to the interconnection elements and determines the particular interconnection element over which to route the data. Element 305 represents a queue or buffer which contains the data to be routed, where this data is received from an external source or internally generated. Element 320 represents a buffer or queue which can optionally be partitioned into multiple buffers or queues 321–329 corresponding to different destinations, types or priorities for the data. In one embodiment, control logic 310, which may include one or more data structures, uses the destination of the data packets and/or lengths of the individual buffers or queues 321–329 in determining over which path or interconnection element the data should be routed. Control logic 310 informs router 315 the path or interconnection element over which to route the data or which buffer or queue 321–329 to place the data. Router 315 then places the data into the appropriate buffer or queue 321–329, or transmits the data to or over the appropriate interconnection device.

FIG. 3B illustrates another embodiment 350 of a distributor, which could be used as distributor 110 (FIG. 1A) or a distributor 141–149 (FIG. 1B). Distributor 350 gets data to be routed to the interconnection elements and determines the particular interconnection element over which to route the data. Elements 360–369 represent one or more queues or buffers which contains the data to be routed, where this data is received from one or more external sources or internally generated. Element 390 represents a buffer or queue which can optionally be partitioned into multiple buffers or queues 391–399 corresponding to different destinations, types or priorities for the data. In one embodiment, control logic 370, which may include one or more data structures, uses the destination of the data packet and lengths of the individual buffers or queues 391–399 in determining over which path or interconnection element the data should be routed. Control logic 370 informs router 375 the path or interconnection element over which to route the data or which buffer or queue 391–399 to place the data. Router 375 then places the data into the appropriate buffer or queue 391–399, or transmits the data to or over the appropriate interconnection device.

FIGS. 3A–B illustrate a small subset of the possible embodiments, while the scope of the invention is much broader. For example, the control logic and routing functions could be performed by a single entity. Also, data could be stored in a single place with data pointers used to manipulate the data rather than actually placing data in outgoing buffers or queues. Similarly, FIGS. 1A–C, and 2 also present only a small subset of the possible embodiments, while the scope of the invention is much broader. The present invention is not limited to any one particular design; rather, it is extensible to an unlimited number of designs in which multiple paths are used to route information, typically in the form of packets.

Figure 4A:
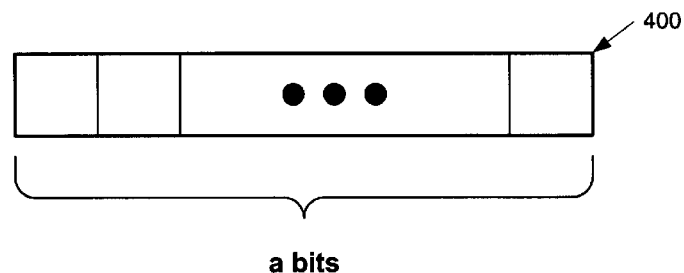
FIGS. 4A–C illustrate an exemplary data structure.
Figure 4B:
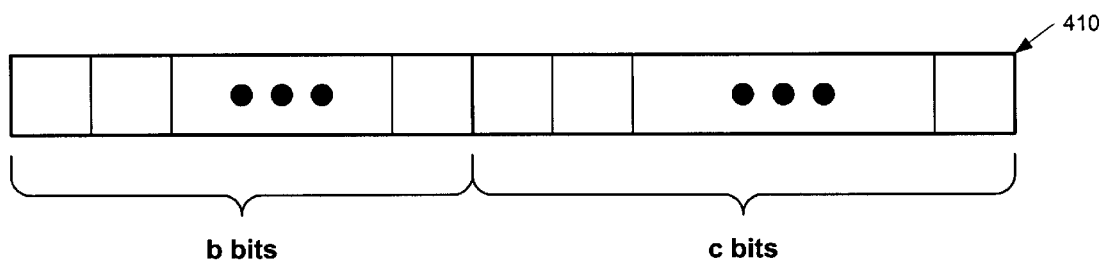
Figure 4C:
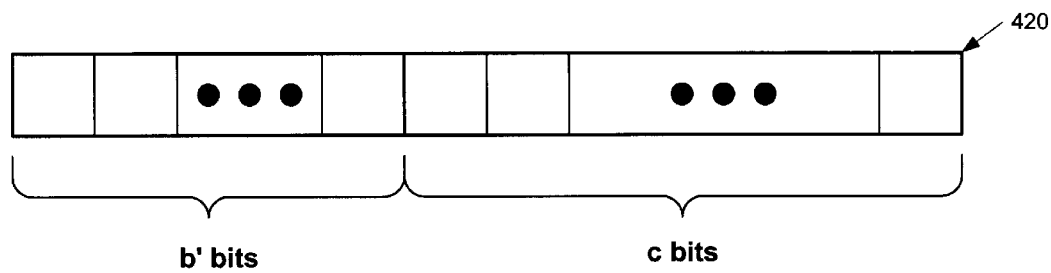

FIGS. 4A–C illustrate embodiments of a data structure used in determining which interconnection device or path a particular data packet should be routed.

A bitmap 400 having a size of a bits is shown in FIG. 4A. In one embodiment, this bitmap 400 is used to determine which of multiple paths or interconnection devices remain available in a distribution cycle for transmitting an information packet. For example, initially the bitmap could be set to all ones, with a one indicating that a path or interconnection device can be used. When a path or interconnection device is used in the cycle, the corresponding bit is set to zero. In certain embodiments, a distribution cycle might be defined to use each path or interconnection device a predetermined number of times in a distribution cycle, where this predetermined number can be one or greater. For example, each path or interconnection device might be used exactly one, two, or three times in each distribution cycle. In the case when the predetermined number is greater than one, an embodiment uses an array data structure instead of a bitmap or a group of counters. This predetermined number could be a static number initially set or determined during the operation of a switching system, or a dynamically number which changes according to the needs of the packet switching system (e.g., based on traffic loads, traffic patterns, congestion, etc.) Additionally, certain paths might be disabled from use, in which case, the corresponding bit is initially set to zero indicating it is not selectable, the possible paths might be AND'ed with a bitmap of enabled routes to produce a bitmap of possible paths to choose between, or the same result might be accomplished via some other mechanism.

The embodiment of the data structure 400 illustrated in FIG. 4A uses one bit for each path or interconnection device. FIG. 4B illustrates another embodiment for decreasing the number of bits required. For example, FIG. 4B illustrates a configuration where the number of paths or interconnection devices has been divided into b groups or subsets. In this case, a data structure 410 could be used having b+c bits, wherein b times c equals (or is greater than) a (the number of paths or interconnection devices). For example, if a is 32, then (b, c) could be one of multiple pairings of values, including (4, 8), which would require a total of 12 bits (instead of 32 bits). Thus, various embodiments could choose to distribute data across a subset of multiple paths or interconnection devices at a time, and then deterministically, randomly, or some combination thereof, traverse the subsets of paths. In which case, the number of bits required for a data structure can be dramatically reduced.

FIG. 4C provides another embodiment of a data structure 420, wherein the current subset within the distribution cycle is identified by the value of b', with b' typically being smaller than b (although not required). Thus, where the data structure 400 illustrated in FIG. 4B uses a bitmap of b bits (one bit for each of the subsets) to identify which of the subsets have been used (or remain available), data structure 420 uses the value identified in the b' bits to indicate the current subset of paths or interconnection devices within the distribution cycle. For example, if there are four subsets within a distribution cycle, typically b would be 4 bits in size, and typically b' would be 2 bits in size (e.g., a 2-bit counter). When a binary counter is used, the number of b' bits is the ceiling of $\log_2 b$. In this case, if a is 32 with four subsets within the distribution cycle, then (b',c) could be (2,8) for a total of 10 bits.

Figure 5A:
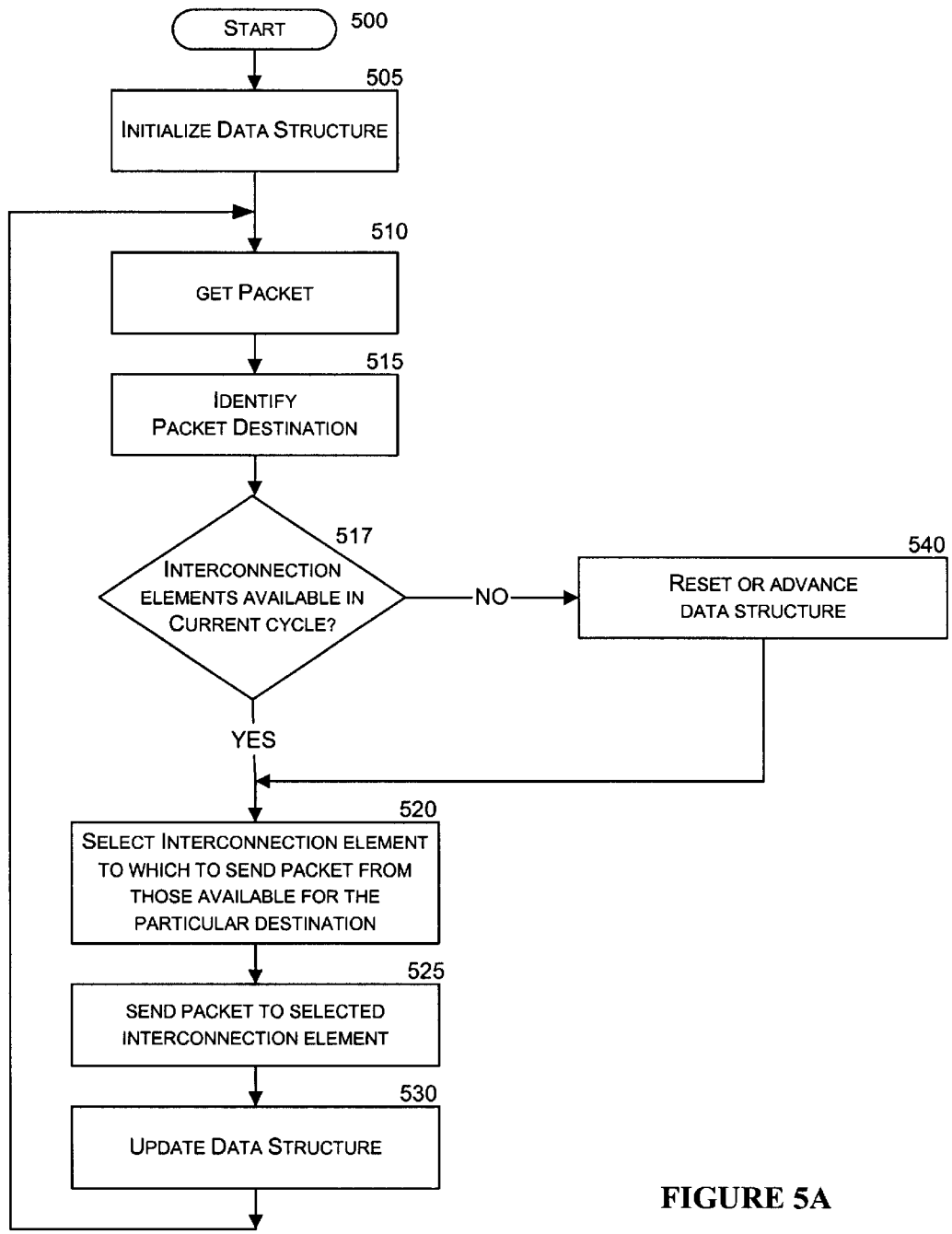
FIGS. 5A–B are flow diagrams illustrating the distribution of packets across multiple paths leading to a destination.
Figure 5B:
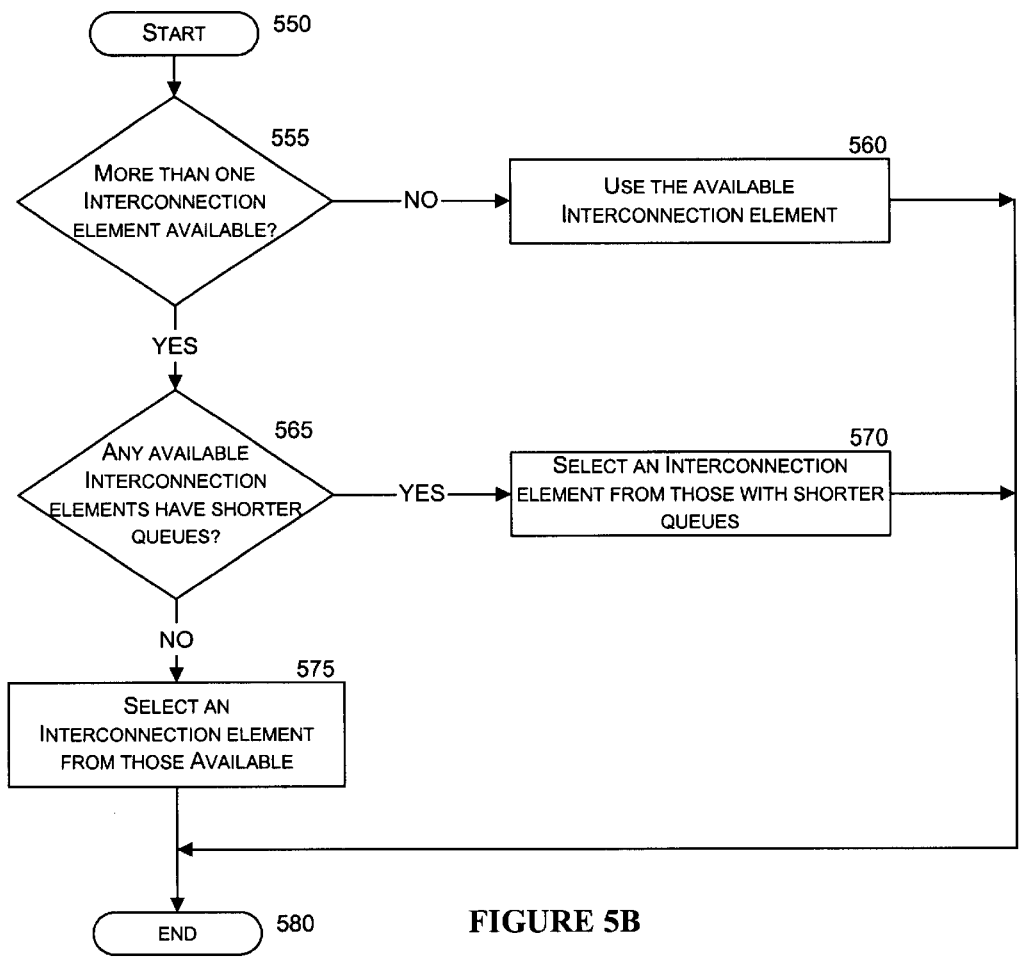

The distribution techniques described herein can be better understood by the flow diagrams of FIGS. 5A–B. FIG. 5A is a flow diagram of one embodiment of a process performed by a distributor for distributing traffic among the plurality of paths. Processing begins at step 500 and proceeds to step 505, wherein a data structure is initialized. Next, in step 510, the distributor gets a packet (whether receiving from an external source, generated internally, or via some other mechanism). Next, in step 515, the distributor identifies a destination for the packet.

If all interconnection elements have been used in this cycle as determined in step 517, then the data structure is reset or advanced to process the next subset or grouping of paths or interconnection elements in step 540. Then, in step 520, the distributor selects an interconnection element to which to send the packet from those that remain available.

One embodiment of the processing of step 520 is described further in FIG. 5B. Processing begins at step 550, and proceeds to step 555, wherein the distributor identifies whether more than one interconnection element is available for routing data or packet. If there is only one interconnection element available, the distributor uses the available interconnection element as indicated by step 560. Otherwise, in step 565, the distributor determines whether any of the available interconnection elements have shorter queues. Other embodiments employ various tie-breaking mechanisms such as a random, round-robin, priority, or other predetermined ordering. If the distributor determines that at least one of the available interconnection elements has a shorter queue, step 570 is performed to select an interconnection element from those with the shortest queues. In selecting between the interconnection elements with the shortest queues a variety of methods may be employed, such as a deterministic (e.g., a round robin between paths leading to the particular destination) or randomized selection, or some combination of the two. Otherwise, in step 575, an interconnection element is selected from those which remain available. Processing then returns to step 525 of FIG. 5A as indicated by step 580.

Returning to FIG. 5A, in step 525, the packet of information is sent to the selected interconnection element (or placed in a corresponding output queue or buffer). Next, in step 530, the data structure is updated to reflect which interconnection element was used. Processing then loops back to step 510. In this manner, the distributor is able to efficiently and optimally distribute traffic among the interconnection elements.

Figure 6A:
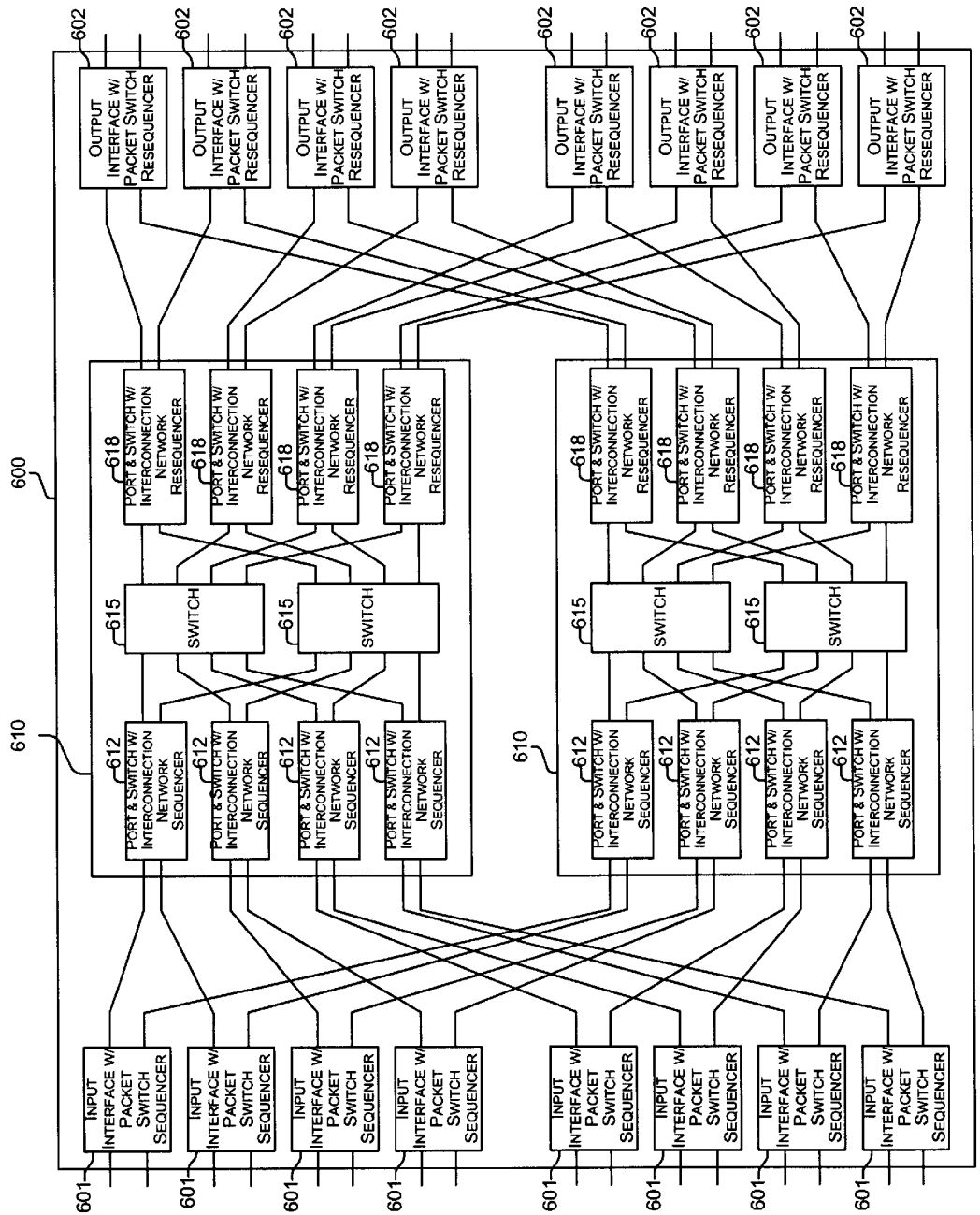
FIGS. 6A–C are block diagrams of a few of many possible embodiments of a packet switch.
Figure 6B:
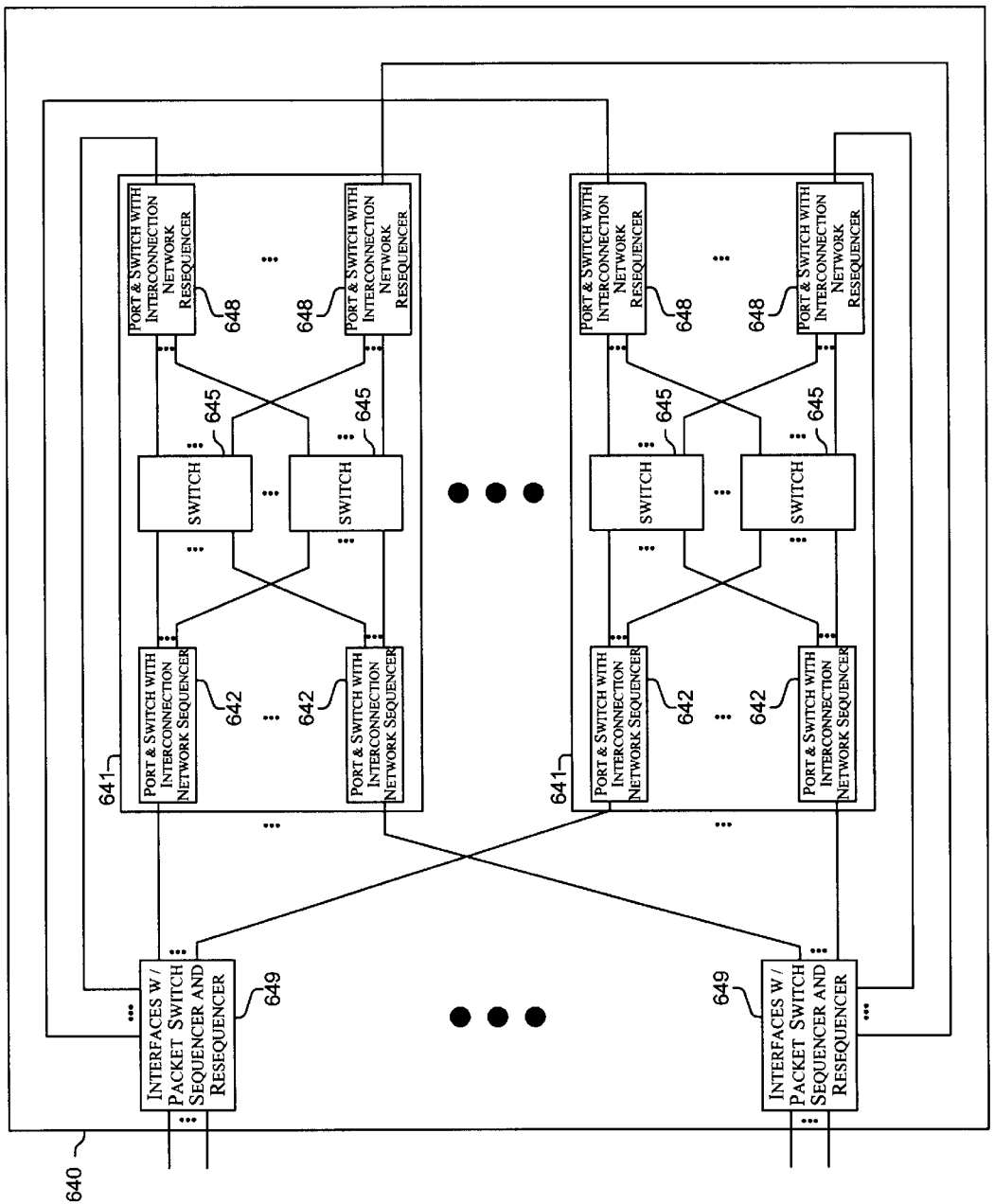
Figure 6C:
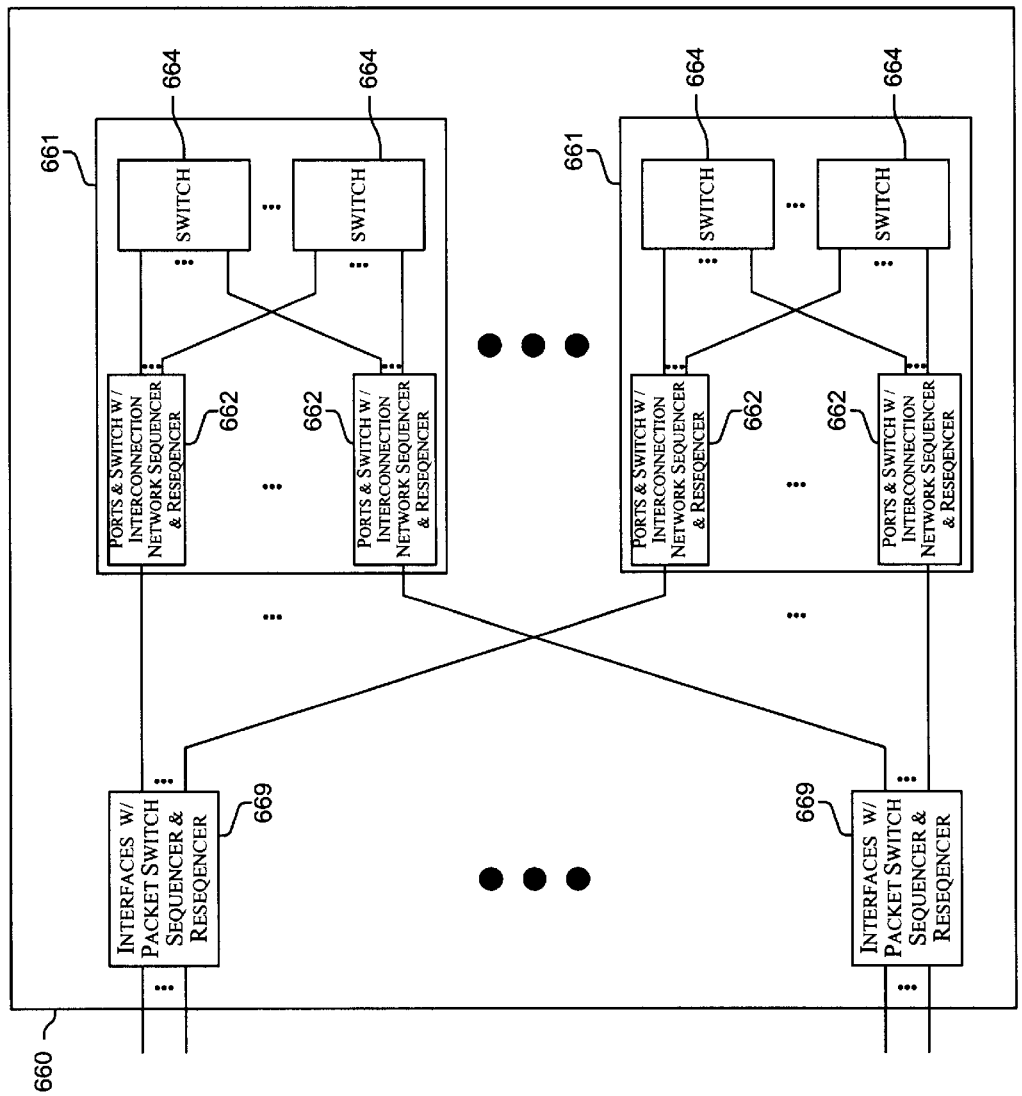

Turning now to the figures, FIGS. 6A–C and their discussion herein are intended to provide a description of various exemplary packet switches and general environments in which hierarchical sets of sequence numbers within a packet switch may be used. The packet switching technique described herein is not limited to a single packet switch. Rather, the architecture and functionality as taught herein and would be understood by one skilled in the art is extensible to an unlimited number of packet switches and embodiments in keeping with the scope and spirit of the invention.

FIGS. 6A–C illustrate different forms of packet switching systems. FIG. 6A illustrates an exemplary packet switch having sixteen inputs and sixteen outputs, and using two eight by eight interconnection networks (or planes of switching elements). FIG. 6B illustrates an exemplary packet switch having multiple interconnection networks and folded input/output interfaces. FIG. 6C illustrates an exemplary folded packet switch having multiple interconnection networks. Of course, the use of hierarchical sets of sequence numbers is not limited to these illustrated operating environments, and operating environments may have more or less elements.

Turning now to FIG. 6A, illustrated is an exemplary embodiment of a packet switch 600. Packet switch 600 comprises multiple input interfaces and packet switch sequencer elements 601 interconnected over multiple links to an interconnection networks 610, which are interconnected over multiple links to output interfaces and packet switch resequencer elements 602. In one embodiment, elements 601 include distributors to distribute traffic across the interconnection networks 610, such as using the even distribution techniques described herein in relation to FIGS. 1–5, or using another distribution technique. Interconnection network 610 as shown comprises multiple switch elements 612, 615, and 618 also interconnected by multiple links. Elements 612 include input ports, interconnection network sequencers, and switches. In one embodiment, elements 612 include distributors to distribute traffic across the paths through interconnection network 610, such as using the even distribution techniques described herein in relation to FIGS. 1–5, or using another distribution technique. Elements 618 include switches, interconnection network resequencers, and output ports. Typically, the input and output interfaces 601 and 602 connect to other systems (not shown) which provide the data to route through the packet switch 600.

Turning now to FIG. 6B, illustrated is another exemplary operating environment and embodiment of a packet switch 640. Packet switch 640 comprises multiple interfaces 649 interconnected over multiple links to interconnection networks 641, which are interconnected over multiple links returning to interfaces 649. Packet switch input and output interfaces 649 include packet switch sequencers and resequencers. In one embodiment, elements 649 include distributors to distribute traffic across the interconnection networks 641, such as using the even distribution techniques described herein in relation to FIGS. 1–5, or using another distribution technique. Interconnection networks 641 as shown comprise multiple switch elements 642, 645, and 648 also interconnected by multiple links. Elements 642 include input ports, interconnection network sequencers, and switches. Elements 648 include switches, interconnection network resequencers, and output ports. Typically, interfaces 649 connect via bi-directional links to other systems (not shown) which provide the data to route through the packet switch 640. In one embodiment, elements 642 include distributors to distribute traffic across the paths through interconnection network 641, such as using the even distribution techniques described herein in relation to FIGS. 1–5, or using another distribution technique.

Turning now to FIG. 6C, illustrated is another exemplary operating environment and embodiment of a packet switch 660. As shown, packet switch 660 has a folded network topology. Packet switch 660 comprises multiple interfaces 669 interconnected over multiple links to interconnection networks 661, which are interconnected over multiple links returning to interfaces 669. Packet switch input and output interfaces 669 include packet switch sequencers and resequencers. In one embodiment, elements 669 include distributors to distribute traffic across the interconnection networks 661, such as using the even distribution techniques described herein in relation to FIGS. 1–5, or using another distribution technique. Interconnection networks 661 as shown comprise multiple switch elements 662 and 664 also interconnected by multiple links. Elements 662 include input ports, interconnection network sequencers, switches, interconnection network resequencers and output ports. Elements 664 include switches. In one embodiment, elements 662 include distributors to distribute traffic across the paths through interconnection network 661, such as using the even distribution techniques described herein in relation to FIGS. 1–5, or using another distribution technique. Typically, interfaces 669 connect via bi-directional links to other systems (not shown) which provide the data to route through the packet switch 660.

Figure 7A:
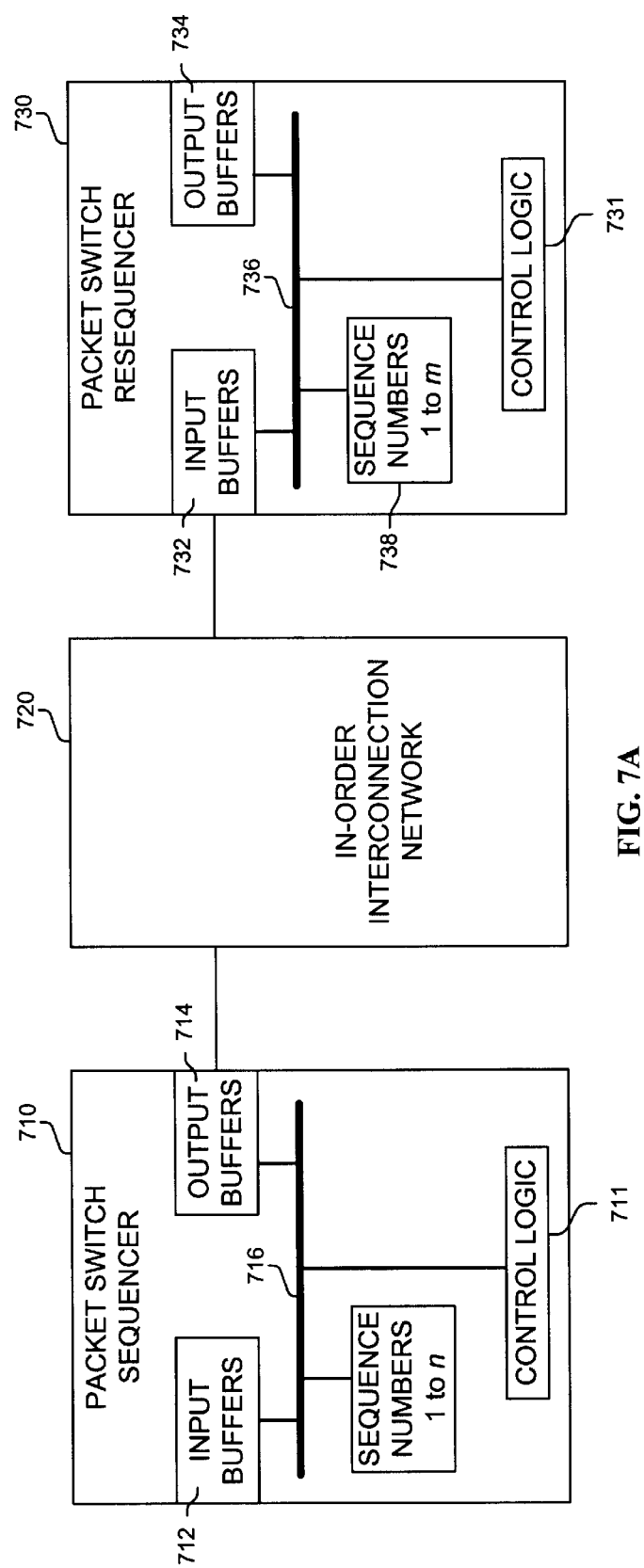
FIG. 7A is a block diagram illustrating exemplary embodiments of a packet switch sequencer and resequencer.
Figure 7B:
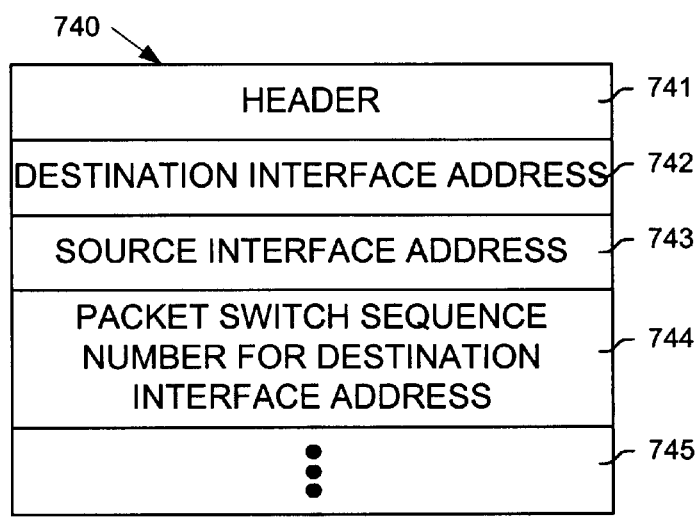
FIG. 7B is a block diagram of a packet format used in an embodiment for adding a packet switch sequence number to a packet being routed through the packet switch.
Figure 7C:
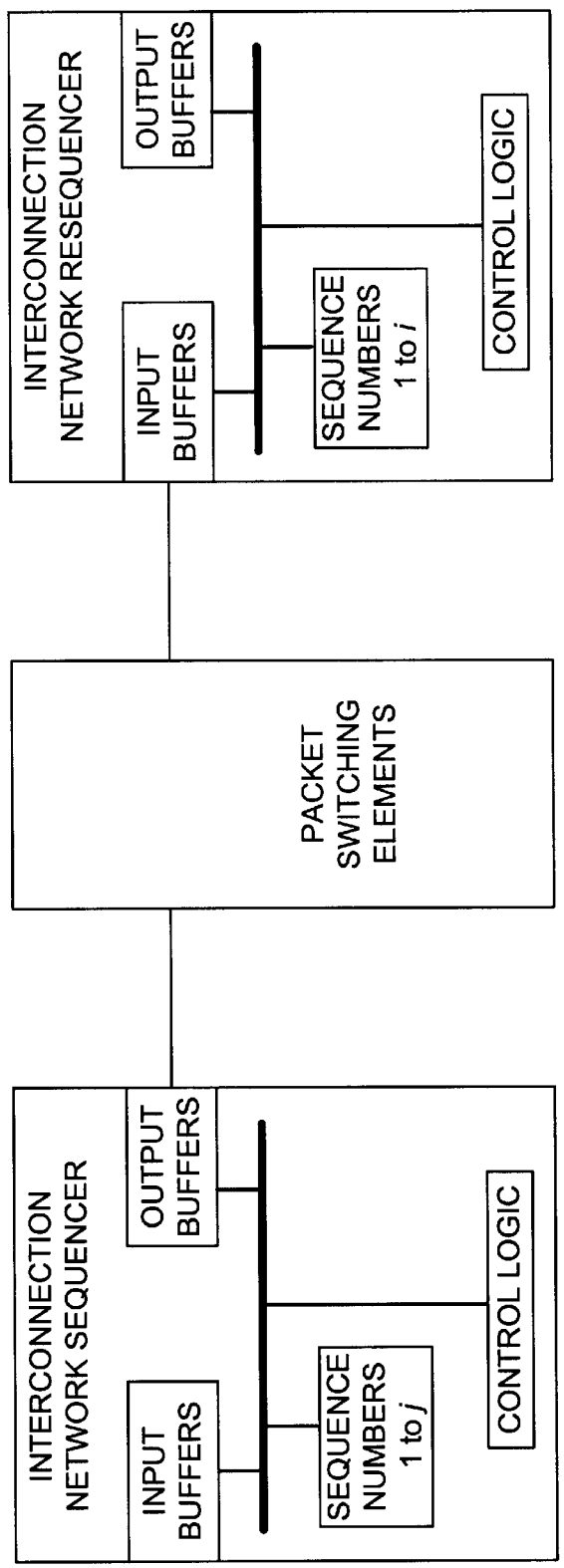
FIG. 7C is a block diagram illustrating exemplary embodiments of an interconnection network sequencer and resequencer.

FIGS. 7A–D illustrate block diagrams and packet formats for using hierarchical sets of sequence numbers to resequence streams of packets within a packet switch. FIG. 7A illustrates a block diagram of the operation of a first level of the sequence number hierarchy, with FIG. 7C representing a second level. The description hereinafter will reference these figures.

Turning to FIG. 7A, illustrated is a block diagram of a packet switch sequencer 710 that maintains and adds packet switch sequence numbers to packets. These packets are forwarded to an in-order delivery interconnection network 720 (e.g., a network that provides streams of packets at its outputs in the order in which they arrived at the inputs). Packet switch sequencer 710 includes a set of input buffers 712 which receive the incoming packets, a set of output buffers 714 used to temporarily hold outgoing packets, a data structure 718 maintaining a current sequence number for each of the n output interfaces of the packet switch, control logic 711, and one or more internal communications mechanisms 716 (shown as a bus for illustrative purposes)

for communication between components of the packet switch sequencer 710. Embodiments of the sequence number data structure 718 include arrays, tables and sets of counters.

Figures 8A, 8B:
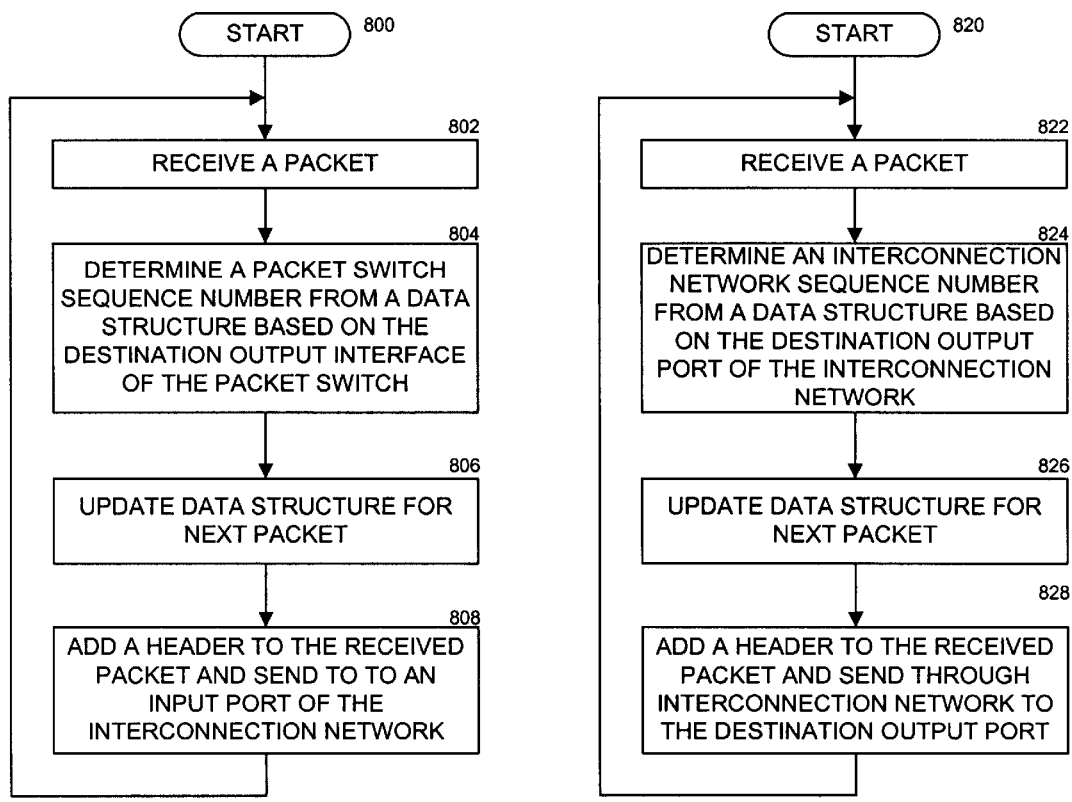

The operation of an embodiment of the packet switch sequencer 710 is illustrated in the flow diagram of FIG. 8A. Referring to FIG. 8A, processing begins at step 800, and proceeds to step 802 where a packet is received. Next, in step 804, a packet switch sequence number is determined based on the output interface of the packet switch system to which the packet is destined. (The corresponding destination output interface maintains a corresponding sequence number so it can resequence the packets and knows the next sequence number to expect from each input interface.) Next, in step 806, the sequence number data structure 718 is updated for the next packet. Then, in step 808, a header is added to the received packet (or inserted in fields of the received packet) containing an appropriate sequence number. An example packet format is illustrated in FIG. 7B. Packet 740 contains a header field 741, a destination interface address field 742, a source interface address field 743, the determined packet sequence number field 744, and the remainder of the packet field 745 which contains the data to be routed and other information. The created packet is then sent out in step 808, and processing returns to step 802 to receive, process and send more packets through the packet switch.

FIG. 7C illustrates one embodiment on an in-order interconnection network element. Other embodiments of an interconnection element include wires, cross-connect systems, packet switches, etc. In the one embodiment shown in FIG. 7C, interconnection network sequencer 760 maintains and adds interconnection network sequence numbers to packets routed through the interconnection network 720 (FIG. 7A). These packets are dynamically routed through multiple packet switching elements 770. Interconnection network sequencer 760 includes a set of input buffers 762 which receive the incoming packets, a set of output buffers 764 used to temporarily hold outgoing packets, a data structure 768 maintaining a current sequence number for each of the j output ports of the interconnection network, control logic 761, and one or more internal communications mechanisms 766 (shown as a bus for illustrative purposes) for communication between components of the interconnection network sequencer 760. Embodiments of the sequence number data structure 768 include arrays, tables and sets of counters.

Figure 7D:
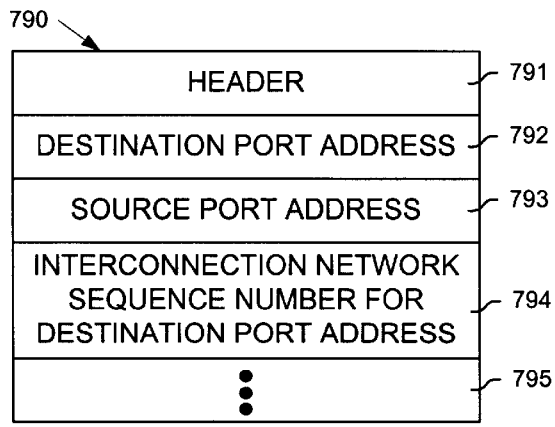
FIG. 7D is a block diagram of a packet format used in an embodiment for adding an interconnection network sequence number to a packet being routed through the packet switch.

The operation of an embodiment of the interconnection network sequencer 760 is illustrated in the flow diagram of FIG. 8B. Referring to FIG. 8B, processing begins at step 820, and proceeds to step 822 where a packet is received. Next, in step 824, an interconnection network sequence number is determined based on the output port of the interconnection network to which the packet is destined. (The corresponding destination output port maintains a corresponding sequence number so it can resequence the packets and knows the next sequence number to expect from each input port.) Next, in step 826, the sequence number data structure 768 is updated for the next packet. Next, in step 828, a header is added to the received packet (or inserted in fields of the received packet) containing an appropriate sequence number. An example packet format is illustrated in FIG. 7D. Packet 790 contains a header field 791, a destination port address field 792, a source port address field 793, the determined interconnection network sequence number field 794, and the remainder of the packet field 795 which contains the data to be routed and other information. The created packet is then sent out in step 828 of FIG. 8B, and processing returns to step 822 to receive, process and send more packets through the packet switch.

Returning to the block diagram of FIG. 7C, the packet 790 (FIG. 7D) routed through packet switching elements 770 is received at the interconnection network resequencer 780. Interconnection network resequencer 780 includes a set of input buffers 782 which receive the incoming packets, a set of output buffers 784 used to temporarily hold outgoing packets, a data structure 788 maintaining a current sequence number for each of the i input ports of the interconnection network, control logic 781, and one or more internal communications mechanisms 786 (shown as a bus for illustrative purposes) for communication between components of the interconnection network sequencer 780. Embodiments of the sequence number data structure 788 include arrays, tables and sets of counters.

The operation of an embodiment of the interconnection network resequencer 780 for processing packets received at its input buffers 782 is illustrated in the flow diagram of FIG. 8C. Referring to FIG. 8C, processing begins at step 840 and proceeds to step 842 where a received packet's interconnection network sequence number 794 is compared to the corresponding sequence number maintained in the sequence number data structure 788 for the packet's source interconnection network input port. Any packets having an interconnection network sequence number less than or equal to the corresponding sequence number maintained in the sequence number data structure 788 are placed in the output buffers 784 and sent out. Next, in step 844, any timed-out packets are sent out or dropped. These timed-out packets could be the result of network congestion or errors within the interconnection network. Processing then loops back to step 842 to process more packets.

Returning to FIG. 7A, packets sent out of interconnection network 720 are received in by the packet switch resequencer 730. Packet switch resequencer 730 includes a set of input buffers 732 which receive the incoming packets, a set of output buffers 734 used to temporarily hold outgoing packets, a data structure 738 maintaining a current sequence number for each of the m input interfaces of the packet switch, control logic 731, and one or more internal communications mechanisms 736 (shown as a bus for illustrative purposes) for communication between components of the packet switch resequencer 730. Embodiments of the sequence number data structure 738 include arrays, tables and sets of counters.

The operation of an embodiment of the packet switch resequencer 730 for processing packets received at its input buffers 732 is illustrated in the flow diagram of FIG. 8D. Referring to FIG. 8D, processing begins at step 860 and proceeds to step 862 where a received packet's packet switch sequence number 744 is compared to the corresponding sequence number maintained in the sequence number data structure 738 for the packet's source packet switch input interface. Any packets having a packet switch sequence number less than or equal to the corresponding sequence number maintained in the sequence number data structure 738 are placed in the output buffers 734 and sent out. Next, in step 864, any timed-out packets are sent out or dropped. These timed-out packets could be the result of network congestion or errors within the interconnection network. Processing then loops back to step 862 to process more packets.

In view of the many possible embodiments to which the principles of our invention may be applied, it will be appreciated that the embodiments and aspects thereof described herein with respect to the drawings/figures are only illustrative and should not be taken as limiting the scope of the invention. To the contrary, the invention as described herein contemplates all such embodiments as may come within the scope of the following claims and equivalents thereof.

What is claimed is:

1. A packet switch comprising:
   a plurality of in-order delivery interconnection elements;
   a plurality of packet switch input interfaces coupled to the plurality of in-order delivery interconnection elements, each packet switch interface including a packet distributor to distribute packets in accordance with a packet distribution scheme across the plurality of in-order delivery interconnection elements and a packet switch sequencer to add a sequence number within a sequence number range to packets to be sent across the plurality of in-order delivery interconnection elements; and
   a plurality of packet switch output interfaces coupled to the plurality of in-order delivery interconnection elements, each packet switch output interface including a packet switch resequencer;
   wherein each of the in-order delivery interconnection elements comprise an in-order delivery interconnection network including a second set of sequence numbers; and
   wherein the plurality of in-order interconnection elements comprise n in-order delivery interconnection elements, and the packet distribution scheme includes sending packets to each of the interconnection elements m number of times in a distribution cycle for a particular packet switch output port, and the sequence number range includes at least mn different sequence numbers.

2. The packet switch of claim 1, wherein the packet distribution scheme evenly distributes packets across the plurality of in-order delivery interconnection elements.

3. The packet switch of claim 1, wherein the packet distribution scheme evenly distributes packets across the plurality of in-order delivery interconnection elements in a non-deterministic manner.

4. The packet switch of claim 1, wherein the plurality of in-order interconnection elements comprise n in-order delivery interconnection elements, and the packet distribution scheme includes sending packets to each of the interconnection elements m number of times in a distribution cycle for a particular packet switch output port, and the sequence number includes a binary representation of $log_2 nm$ bits.

5. The packet switch of claim 4, wherein m is one or two.

6. The packet switch of claim 1, wherein each of the in-order delivery interconnection elements comprise a link or an in-order delivery interconnection network.

7. The packet switch of claim 1, wherein each packet switch resequencer includes a packet switch resequencing data structure, the packet switch resequencing data structure including an indication of a packet switch packet input sequence number for each of the plurality of packet switch input interfaces.

8. The packet switch of claim 7, wherein each of the plurality of packet switch input interfaces includes a packet switch sequencing data structure, the packet switch sequencing data structure including an indication of a packet switch output packet sequence number for each of the plurality of packet switch output interfaces.

9. The packet switch of claim 1, wherein each of the packet distributors includes a data structure including an indication of one or more of the interconnection elements that were previously selected to receive, or remain available to receive, one or more packets.

10. The packet switch of claim 1, wherein each of the packet distributors includes a data structure including a set of indicators to indicate which of the interconnection elements were previously selected to, or remain available to receive one of the packets in a current distribution cycle, wherein a particular interconnection element is only selected a predetermined number of times in the current distribution cycle.

11. The packet switch of claim 10, wherein the predetermined number of times in the current distribution cycle is one or two.

12. A packet switch comprising:
    a plurality of interconnection networks, each of the plurality of interconnection network includes a plurality of interconnection network input ports and a plurality of interconnection network output ports, each of the plurality of interconnection input ports including an interconnection network sequencer, each of the plurality of interconnection network output ports including an interconnection network resequencer;
    a plurality of packet switch input interfaces coupled to the plurality of interconnection networks each of the plurality of packet switch input interfaces including a packet switch sequencer; and
    a plurality of packet switch output interfaces coupled to the plurality of interconnection networks, each packet switch output interface includes a packet switch resequencer.

13. The packet switch of claim 12, wherein each of the interconnection network output ports includes an interconnection network resequencing data structure, the interconnection network resequencing data structure including an indication of an interconnection network input packet sequence number expected to arrive next in sequence for each of the interconnection network input ports.

14. The packet switch of claim 13, wherein each of the interconnection network input ports includes an interconnection network sequencing data structure, the interconnection network sequencing data structure including an indication of an interconnection network output packet sequence number for each of the interconnection network output ports.

15. The packet switch of claim 14, wherein each of the packet switch output interfaces includes a packet switch resequencing data structure, the packet switch resequencing data structure including an indication of a packet switch packet input sequence number expected to arrive next in sequence for each of the packet switch input interfaces, and further wherein each of the packet switch input interfaces includes a packet switch sequencing data structure, the packet switch sequencing data structure including an indication of a packet switch output packet sequence number for each of the packet switch output interfaces.

16. The packet switch of claim 12, wherein each of the packet switch output interfaces includes a packet switch resequencing data structure, the packet switch resequencing data structure including an indication of a packet switch packet input sequence number for each of the packet switch input interfaces.

17. The packet switch of claim 16, wherein each of the packet switch input interfaces includes a packet switch sequencing data structure, the packet switch sequencing data structure including an indication of a packet switch output packet sequence number for each of the packet switch output interfaces.

18. The packet switch of claim 12, wherein each particular interconnection network input interface of the plurality of interconnection network input interfaces includes a distributor to evenly distribute packets across the plurality of paths between the particular interconnection network input interface and each interconnection network output interface for packets being sent between the particular interconnection network input interface and each destination interconnection network output interface.

19. The packet switch of claim 12, wherein each of the plurality of packet switch input interfaces includes a distributor to evenly distribute packets across the plurality of interconnection networks for packets being sent to each destination packet switch output interface.

20. The packet switch of claim 19, wherein each particular interconnection network input interface of the plurality of interconnection network input interfaces includes a distributor to evenly distribute packets across the plurality of paths between the particular interconnection network input interface and each interconnection network output interface for packets being sent between the particular interconnection network input interface and each destination interconnection network output interface.

21. The packet switch of claim 19, wherein each of the distributors includes a data structure including an indication of one or more of the interconnection networks that were previously selected to receive, or remain available to receive one or more of the packets.

22. The packet switch of claim 19, wherein each of the distributors includes a data structure including a set of indicators to indicate which of the interconnection elements were selected to, or remain available to receive one of the packets in a current distribution cycle, wherein a particular interconnection element is only selected a predetermined number of times in the current cycle.

23. The packet switch of claim 22, wherein the predetermined number of times in the current distribution cycle is one.

24. A method comprising:
maintaining a first packet switch sequence number for each of a plurality of output interfaces at each of a plurality of input interfaces of a packet switch;
maintaining a first interconnection network sequence number for each of a plurality of output ports at each of a plurality of input ports of a plurality of interconnection networks;
receiving a first packet at a first input interface;
adding to the first packet the first packet switch sequence number maintained at the first input interface for a destination output interface of the first packet;
forwarding the first packet to a particular one of the plurality of interconnection networks leading to the destination output interface;
receiving the first packet at a first input port of the particular interconnection network; and
adding to the first packet the first interconnection network sequence number maintained at the first input port for a destination output port to which the first packet is destined.

25. The method of claim 24, further comprising:
maintaining a second interconnection network sequence number for each input port at each output port;
receiving the first packet at the destination output port; and
determining whether to forward the first packet to one of the output interfaces based on a comparison of the first and second interconnection network sequence numbers.

26. The method of claim 25, further comprising:
maintaining a second packet switch sequence number for each input interface at each output interface;
receiving the first packet at the destination output interface; and
determining whether to forward the first packet out of the destination output interface based on a comparison of the first and second packet switch sequence numbers.

27. The method of claim 24, further comprising:
maintaining a traffic data structure at each of the plurality of input interfaces of the packet switch; and
selecting one of the plurality of interconnection networks leading to the destination output interface over which to route the first packet based on the destination output interface and the traffic data structure.

28. The method of claim 27, wherein the traffic data structure includes traffic pattern information between the input interface at which the traffic data structure is maintained and the destination output interface.

29. The method of claim 28, wherein the traffic data structure includes an indication of the availability for each of interconnection networks to be sent a packet.

30. The method of claim 28, wherein the traffic data structure includes a set of indicators to indicate which of the plurality of interconnection networks were selected to be sent a packet in a current cycle, wherein a packet is only selected to be sent to a particular interconnection network a predetermined number of times in the current cycle.

31. A method comprising:
adding a first packet switch sequence number to a first packet;
adding a first interconnection network sequence number to the first packet;
maintaining a first output interconnection network sequence number at each output port;
comparing the first interconnection network sequence number with the first output interconnection network sequence number;
adding a second packet switch sequence number to a second packet;
adding a second interconnection network sequence number to the second packet;
receiving the first packet before the second packet at a first output port; and
forwarding the second packet from the first output port before the first packet when the second interconnection network sequence number comes before the first interconnection network sequence number in a predefined sequence.

32. The method of claim 31, further comprising:
maintaining a second output interconnection network sequence number at the first output port; and
comparing the first interconnection sequence number with the second output interconnection sequence number.

33. The method of claim 32, further comprising comparing the second interconnection sequence number with the second output interconnection sequence number.

34. A method comprising:
adding a first packet switch sequence number to a first packet;
adding a first interconnection network sequence number to the first packet;
maintaining a first output interconnection network sequence number at each output port;

comparing the first interconnection network sequence number with the first output interconnection network sequence number;

maintaining a first packet switch output sequence number at each output interface; and comparing the first packet switch sequence number with the first packet switch output sequence number;

adding a second packet switch sequence number to a second packet;

adding a second interconnection network sequence number to the second packet;

receiving the first packet before the second packet at a first output interface; and forwarding the second packet from the first output interface before the first packet when the second packet switch number comes before the first packet switch number in a predefined sequence.

35. The method of claim 34, further comprising:

maintaining a second output packet switch sequence number at the first output interface; and comparing the first packet switch sequence number with the second output packet switch sequence number.

36. The method of claim 35, further comprising comparing the second packet switch sequence number with the second output packet switch sequence number.

37. The method of claim 34, further comprising:

adding a second packet switch sequence number to the second packet;

adding a second interconnection network sequence number to the second packet;

receiving the first packet before the second packet at a first output port; and forwarding the second packet from the first output port to the first output interface before the first packet when the second interconnection network sequence number comes before the first interconnection network sequence number in a predefined sequence.

38. The method of claim 37, further comprising:

maintaining a second output interconnection network sequence number at the first output port; and comparing the first interconnection sequence number with the second output interconnection sequence number.

39. The method of claim 38, further comprising comparing the second interconnection sequence number with the second output interconnection sequence number.

40. A packet switch comprising:

a plurality of in-order delivery interconnection elements;

a plurality of packet switch input interfaces coupled to the plurality of in-order delivery interconnection elements, each packet switch interface including a packet distributor to distribute packets in accordance with a packet distribution scheme across the plurality of in-order delivery interconnection elements and a packet switch sequencer to add a sequence number within a sequence number range to packets to be sent across the plurality of in-order delivery interconnection elements; and a plurality of packet switch output interfaces coupled to the plurality of in-order delivery interconnection elements, each packet switch output interface including a packet switch resequencer;

wherein the plurality of in-order interconnection elements comprise n in-order delivery interconnection elements, and the packet distribution scheme includes sending packets to each of the interconnection elements m number of times in a distribution cycle for a particular packet switch output port, and the sequence number includes a binary representation of $\log_2 nm$ bits.

41. The packet switch of claim 40, wherein m is one or two.

42. A packet switch comprising:

a plurality of in-order delivery interconnection elements;

a plurality of packet switch input interfaces coupled to the plurality of in-order delivery interconnection elements, each packet switch interface including a packet distributor to distribute packets in accordance with a packet distribution scheme across the plurality of in-order delivery interconnection elements and a packet switch sequencer to add a sequence number within a sequence number range to packets to be sent across the plurality of in-order delivery interconnection elements; and a plurality of packet switch output interfaces coupled to the plurality of in-order delivery interconnection elements, each packet switch output interface including a packet switch resequencer;

wherein the plurality of in-order interconnection elements comprise n in-order delivery interconnection elements, and the packet distribution scheme includes sending packets to each of the interconnection elements m number of times in a distribution cycle for a particular packet switch output port, and the sequence number range includes at least mn different sequence numbers.

43. An apparatus comprising:

means for maintaining a first packet switch sequence number for each of a plurality of output interfaces at each of a plurality of input interfaces of a packet switch;

means for maintaining a first interconnection network sequence number for each of a plurality of output ports at each of a plurality of input ports of a plurality of interconnection networks;

means for receiving a first packet at a first input interface;

means for adding to the first packet the first packet switch sequence number maintained at the first input interface for a destination output interface of the first packet;

means for forwarding the first packet to a particular one of the plurality of interconnection networks leading to the destination output interface;

means for receiving the first packet at a first input port of the particular interconnection network; and means for adding to the first packet the first interconnection network sequence number maintained at the first input port for a destination output port to which the first packet is destined.

44. The apparatus of claim 43, comprising:

means for maintaining a second interconnection network sequence number for each input port at each output port;

means for receiving the first packet at the destination output port; and means for determining whether to forward the first packet to one of the output interfaces based on a comparison of the first and second interconnection network sequence numbers.

45. The apparatus of claim 44, comprising:

means for maintaining a second packet switch sequence number for each input interface at each output interface;

means for receiving the first packet at the destination output interface; and means for determining whether to forward the first packet out of the destination output interface based on a comparison of the first and second packet switch sequence numbers.

46. The apparatus of claim 43, comprising:

means for maintaining a traffic data structure at each of the plurality of input interfaces of the packet switch; and means for selecting one of the plurality of interconnection networks leading to the destination output interface over which to route the first packet based on the destination output interface and the traffic data structure.

47. The apparatus of claim 46, wherein the traffic data structure includes traffic pattern information between the input interface at which the traffic data structure is maintained and the destination output interface.

48. The apparatus of claim 47, wherein the traffic data structure includes an indication of the availability for each of interconnection networks to be sent a packet.

49. The apparatus of claim 47, wherein the traffic data structure includes a set of indicators to indicate which of the plurality of interconnection networks were selected to be sent a packet in a current cycle, wherein a packet is only selected to be sent to a particular interconnection network a predetermined number of times in the current cycle.

50. An apparatus comprising:

means for adding a first packet switch sequence number to a first packet;

means for adding a first interconnection network sequence number to the first packet;

means for maintaining a first output interconnection network sequence number at each output port;

means for comparing the first interconnection network sequence number with the first output interconnection network sequence number;

means for adding a second packet switch sequence number to a second packet;

means for adding a second interconnection network sequence number to the second packet;

means for receiving the first packet before the second packet at a first output port; and means for forwarding the second packet from the first output port before the first packet when the second interconnection network sequence number comes before the first interconnection network sequence number in a predefined sequence.

51. The apparatus of claim 50, comprising:

means for maintaining a second output interconnection network sequence number at the first output port; and means for comparing the first interconnection sequence number with the second output interconnection sequence number.

52. The apparatus of claim 51, comprising means for comparing the second interconnection sequence number with the second output interconnection sequence number.

53. An apparatus comprising:

means for adding a first packet switch sequence number to a first packet;

means for adding a first interconnection network sequence number to the first packet;

means for maintaining a first output interconnection network sequence number at each output port;

means for comparing the first interconnection network sequence number with the first output interconnection network sequence number;

means for maintaining a first packet switch output sequence number at each output interface; and means for comparing the first packet switch sequence number with the first packet switch output sequence number;

means for adding a second packet switch sequence number to a second packet;

means for adding a second interconnection network sequence number to the second packet;

means for receiving the first packet before the second packet at a first output interface; and means for forwarding the second packet from the first output interface before the first packet when the second packet switch number comes before the first packet switch number in a predefined sequence.

54. The apparatus of claim 53, comprising:

means for maintaining a second output packet switch sequence number at the first output interface; and means for comparing the first packet switch sequence number with the second output packet switch sequence number.

55. The apparatus of claim 54, comprising means for comparing the second packet switch sequence number with the second output packet switch sequence number.

56. The apparatus of claim 53, comprising:

means for adding a second packet switch sequence number to the second packet;

means for adding a second interconnection network sequence number to the second packet;

means for receiving the first packet before the second packet at a first output port; and means for forwarding the second packet from the first output port to the first output interface before the first packet when the second interconnection network sequence number comes before the first interconnection network sequence number in a predefined sequence.

57. The apparatus of claim 56, comprising:

means for maintaining a second output interconnection network sequence number at the first output port; and means for comparing the first interconnection sequence number with the second output interconnection sequence number.

58. The apparatus of claim 57, comprising means for comparing the second interconnection sequence number with the second output interconnection sequence number.

59. A packet switch comprising:

a plurality of in-order delivery interconnection elements;

a plurality of packet switch input interfaces coupled to the plurality of in-order delivery interconnection elements, each packet switch interface including a packet distributor to distribute packets in accordance with a packet distribution scheme across the plurality of in-order delivery interconnection elements and a packet switch sequencer to add a sequence number within a sequence number range to packets to be sent across the plurality of in-order delivery interconnection elements; and a plurality of packet switch output interfaces coupled to the plurality of in-order delivery interconnection elements, each packet switch output interface including a packet switch resequencer;

wherein each of the in-order delivery interconnection elements comprise an in-order delivery interconnection network including a second set of sequence numbers; and wherein the plurality of in-order interconnection elements comprise n in-order delivery interconnection elements, and the packet distribution scheme includes sending packets to each of the interconnection elements m number of times in a distribution cycle for a particular packet switch output port, and the sequence number includes a binary representation of $\log_2 nm$ bits.

60. The packet switch of claim 59, wherein m is one or two.

61. A packet switch comprising:

a plurality of in-order delivery interconnection elements;

a plurality of packet switch input interfaces coupled to the plurality of in-order delivery interconnection elements, each packet switch interface including a packet distributor to distribute packets in accordance with a packet distribution scheme across the plurality of in-order delivery interconnection elements and a packet switch sequencer to add a sequence number within a sequence number range to packets to be sent across the plurality of in-order delivery interconnection elements; and a plurality of packet switch output interfaces coupled to the plurality of in-order delivery interconnection elements, each packet switch output interface including a packet switch resequencer;

wherein each of the in-order delivery interconnection elements comprise an in-order delivery interconnection network including a second set of sequence numbers; and wherein each of the packet distributors includes a data structure including a set of indicators to indicate which of the interconnection elements were previously selected to, or remain available to receive one of the packets in a current distribution cycle, wherein a particular interconnection element is only selected a predetermined number of times in the current distribution cycle.

62. The packet switch of claim 61, wherein the predetermined number of times in the current distribution cycle is one or two.

* * * * *

UNITED STATES PATENT AND TRADEMARK OFFICE
CERTIFICATE OF CORRECTION

PATENT NO.     : 6,747,972 B1
DATED          : June 8, 2004
INVENTOR(S)    : Lenoski et al.

Page 1 of 1

It is certified that error appears in the above-identified patent and that said Letters Patent is hereby corrected as shown below:

Column 10,
Line 4, replace "193 Distributor" with -- 193. Distributor --.

Signed and Sealed this

Twentieth Day of September, 2005

JON W. DUDAS
*Director of the United States Patent and Trademark Office*